(12) United States Patent
Imanishi et al.

(10) Patent No.: US 7,395,285 B2
(45) Date of Patent: Jul. 1, 2008

(54) GARBAGE COLLECTION SYSTEM

(75) Inventors: Yuko Imanishi, Higashihiroshima (JP); Shigenori Doi, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 370 days.

(21) Appl. No.: 10/541,029

(22) PCT Filed: Jun. 21, 2004

(86) PCT No.: PCT/JP2004/009043

§ 371 (c)(1), (2), (4) Date: Jun. 28, 2005

(87) PCT Pub. No.: WO2005/001695

PCT Pub. Date: Jan. 6, 2005

(65) Prior Publication Data

US 2006/0074988 A1  Apr. 6, 2006

(30) Foreign Application Priority Data

Jun. 30, 2003  (JP) .............................. 2003-187690

(51) Int. Cl.
*G06F 12/00* (2006.01)
(52) U.S. Cl. ..................... 707/206; 707/200; 707/205
(58) Field of Classification Search ................. 707/200, 707/205–206
See application file for complete search history.

(56) References Cited

U.S. PATENT DOCUMENTS 6,317,119 B1 * 11/2001 Wakeland et al. ........... 345/161
6,763,370 B1 *  7/2004 Schmeidler et al. ......... 709/203
7,058,929 B2 *  6/2006 Charnell et al. ............. 717/135
2002/0069317 A1 *  6/2002 Chow et al. ................. 711/104

(Continued)

FOREIGN PATENT DOCUMENTS

JP  3027845  2/2000

(Continued)

OTHER PUBLICATIONS

Tamar Domani et al., "Thread-Local Heaps for Java", International Symposium on Memory Management, Jun. 2002, pp. 76 to 87.

(Continued)

*Primary Examiner*—Don Wong
*Assistant Examiner*—Linh Black
(74) *Attorney, Agent, or Firm*—Wenderoth, Lind & Ponack, L.L.P.

(57) ABSTRACT

A garbage collection (GC) system reducing CPU time required for GC without stopping all Application Program threads for an excessive amount of time. The GC system frees memory areas corresponding to objects that are no longer required in an execution procedure of an object-oriented program including a plurality of threads. The GC system includes a selection unit operable to select the threads, an examination unit operable to examine the selected thread by (i) stopping execution of the thread, (ii) finding an object that is accessible from the thread via an object pointer, (iii) managing the found object as a non-freeing target, and (iv) resuming execution of the thread. The GC system also includes a detection unit operable to manage an object identified by the processing target object pointer, as a non-freeing target, and a freeing unit operable to free memory areas corresponding to objects other than the objects that are non-freeing targets.

15 Claims, 20 Drawing Sheets

U.S. PATENT DOCUMENTS

2002/0165848 A1 * 11/2002 Rautenbach et al. ........... 707/1

OTHER PUBLICATIONS

Taichi Yuasa, "Algorithms for Realtime Garbage Collection", Joho Shori, Information Processing Society of Japan, Nov. 15, 1994, vol. 35, No. 11, pp. 1006-1013.

"Strategy and Technology for Management of Memory in KVM", by Guangjun Huang, Jian Wu, and Zhengguo Hu, Computer Engineering, Jan. 2003, vol. 29, No. 1 with verified English Translation.

"Garbage Collection of Java", Computer Knowledge and Technology, 2003 with verified English Translation.

* cited by examiner

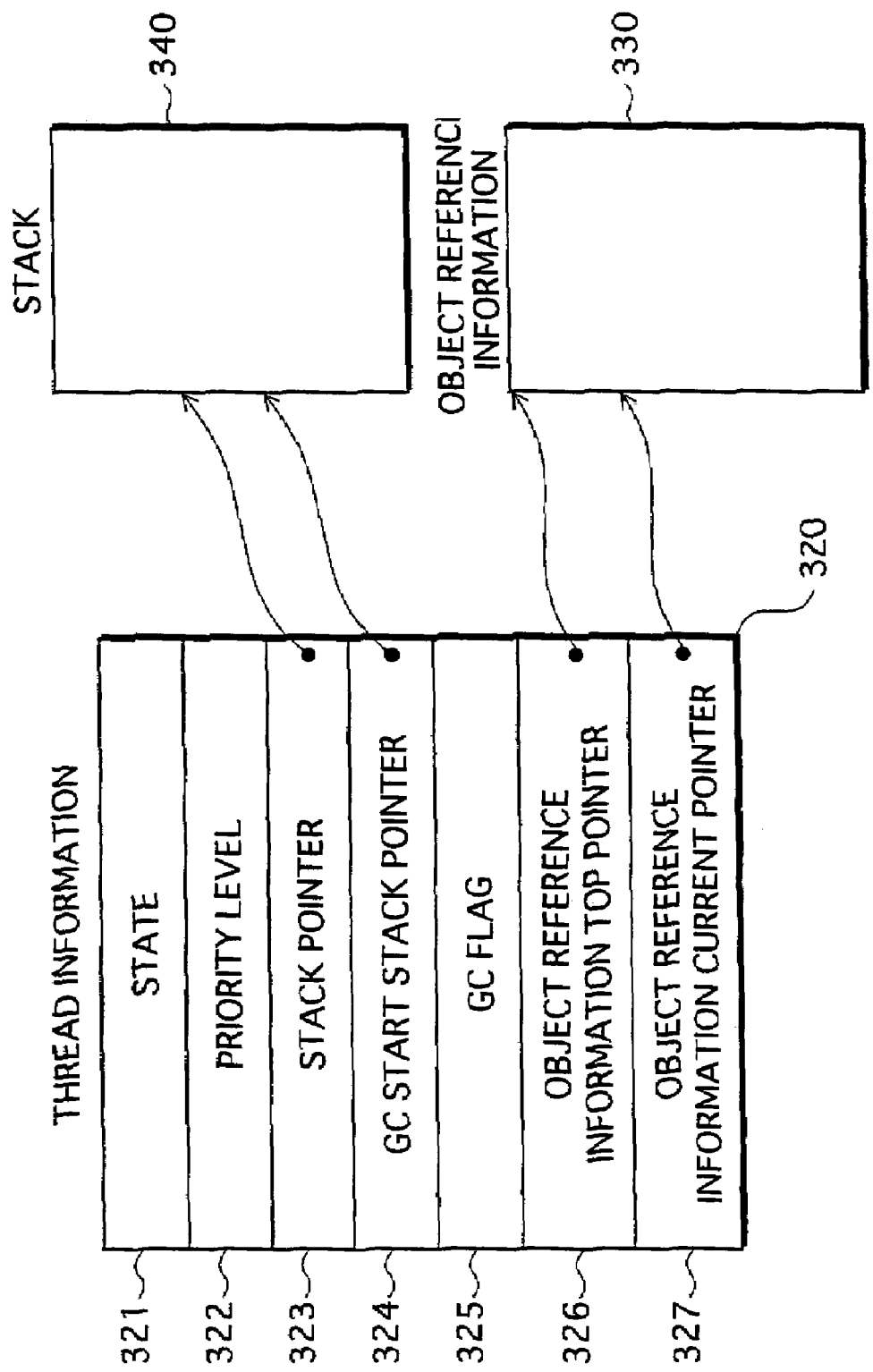

FIG.6
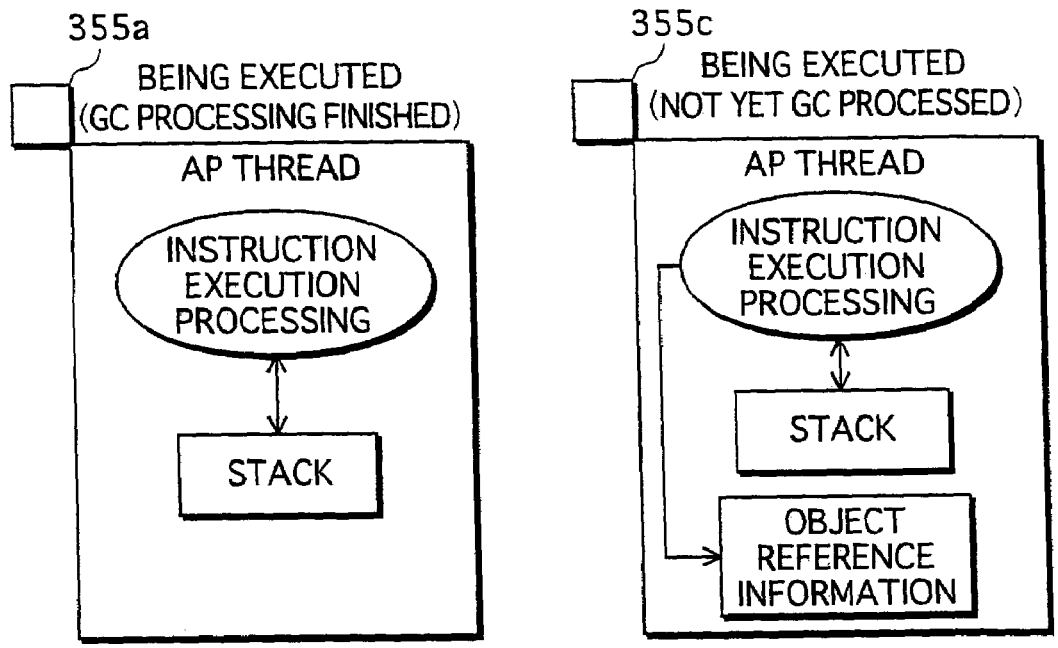
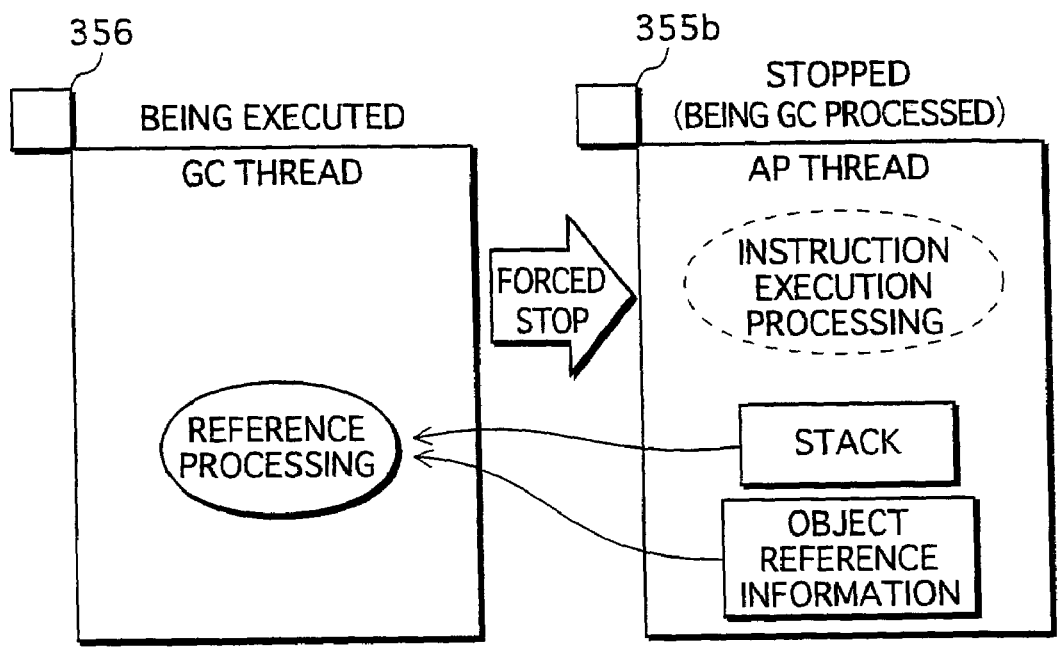

FIG.7

THREAD SELECTION CONDITION

| | | |
|---|---|---|
| 422 | THREAD STATE | WAIT STATE |
| 423 | THREAD PRIORITY LEVEL | LOW |
| 424 | STACK SIZE | SMALL |

421

GARBAGE COLLECTION SYSTEM

BACKGROUND OF THE INVENTION

1. Field of the Invention

The present invention relates to garbage collection (GC) in a memory used by an application program (AP).

2. Background of the Related Art

In some conventional object oriented programming languages, freeing of memory area corresponding to objects (also called "object instance") that are no longer required after being used by an AP is the responsibility of the execution environment. Employing such a method relieves the creator of the AP from being concerned with allocation and freeing of memory area. One example of an object oriented programming language is Java. Note that Java is a trademark of the Sun Microsystems Inc., of the USA.

An AP written using such a language is run on an execution environment that includes a garbage collection (GC) mechanism that automatically frees the memory area corresponding to objects that are no longer required.

When an AP is being executed, the GC configuration detects that a memory area corresponding to a dynamically-allocated object is not being referenced from anywhere, and frees the memory area so that the memory area is in a reusable state.

In a multithreaded AP, each thread corresponds to a stack area, and, in an operation process, stores data in the stack area, refers to stored data, and generates an object. Ordinarily when an object is generated, a pointer for the object (hereinafter called an "object pointer") is stored in the stack area. The object pointer is data indicating the location of the object in the memory. The object is accessed from the thread by referring to the object pointer. Furthermore, ordinarily, an object pointer to another object is also stored in the object.

All objects that are being referenced by the AP at a particular point in time can be reached either directly from an object pointer included in one of the stack areas corresponding to the threads, or via the object pointers in one or more objects.

In response to this, the GC mechanism essentially determines that a memory area corresponding to an object that is no longer reachable from an object pointer in a stack at a particular point in time is no longer required, and frees the memory area.

One conventional GC method is mark-and-sweep. The mark-and-sweep method marks all objects that can be reached from an object pointer, then scans all objects, and frees memory area corresponding to objects that are not marked.

When this mark-and-sweep GC is performed during the execution of a multithreaded AP, priority may be given to prompt performance of GC. To do so, marking of all objects that can be reached from an object pointer in the stack corresponding to each thread is performed after simply stopping all threads. Then the stop on all the threads is released, and objects that are not marked are freed. However, the following problem occurs in such a case.

Specifically, there is a possibility that all the threads of the AP will be stopped for a relatively long time. During this time, the computer does not react to user operations or the like, and, as one example, the display contents on the display of the computer may remain the same. This causes confusion for the user.

One method for solving this problem is disclosed in Japanese Patent No. 3027845. This method proposes GC using mark-and-sweep that is executed without stopping a multithreaded AP at all.

With this method, first processing is performed for marking all objects that can be reached from an object that is a root node and all objects that can be reached from object pointers in the stack area for each thread. Second processing is then performed, when an object pointer to an object has moved due to an operation of a thread of an AP (hereinafter called an, "AP thread") during the first processing, and is for stacking data expressing that object in a mark stack area, and when the marking processing is complete, further marking all objects that can be reached from the mark stack. Finally, memory areas corresponding to unmarked objects are freed.

However, with this method that marks without stopping the AP, there is a possibility that, since data in the stack area changes due to AP thread operation, part of the processing for marking objects that can be reached from the object pointer in the stack area will be wasteful.

Take, for example, the following case. While a thread for garbage collecting is executing processing (here, called "processing A") for detecting an object pointer (here, called "object pointer A") in one stack area of the AP and marking objects that are reachable from the object pointer A, the AP thread corresponding to the stack area copies the object pointer A or the one or more object pointers in the objects, and newly stores the copied object pointer A or object pointers in a stack area. Here, the thread that performs GC will, after ending the processing A, either perform processing that duplicates the processing A in part, or perform check processing to prevent duplicate processing. Either processing will be wasteful. This wasteful processing leads to an unnecessary increase in the CPU time required from start to completion of GC, and consequently lowers the usage efficiency of the CPU.

BRIEF SUMMARY OF THE INVENTION

The present invention was conceived in view of the stated problem, and has an object of providing a garbage collection (GC) system that uses a GC method which prevents the time for which all threads of an AP are stopped from being excessively long, and which suppresses, to an extent, wasteful increases in CPU time taken from the start to completion of GC.

In order to achieve the stated object, the present invention is a garbage collection system that frees memory areas corresponding to objects that are no longer required in an execution procedure of an object-oriented program composed of a plurality of threads, the garbage collection system including: a selection unit operable to select the threads one at a time; an examination unit operable to execute examination processing with respect to the selected thread, the examination processing including procedures of stopping execution of the thread, finding an object that is accessible from the thread by referring to an object pointer, managing the found object as a non-freeing target, and resuming execution of the thread; a detection unit operable to, when having detected, after the selection unit has commenced selecting, that an object pointer has been processed as a processing target by a currently-executed thread, manage an object indicated by the processing target object pointer, as a non-freeing target; and a freeing unit operable to, after the examination processing has been completed with respect to all of the threads, free memory areas that correspond to objects other than the objects that are managed as non-freeing targets.

Here, an object pointer being processed as a processing target by a thread means that, in the processing procedure of the thread by the CPU, an instruction is executed that processes the object pointer as a processing target.

Furthermore, managing an object as a non-freeing target denotes the realization of marking by using a method such as that described later that moves the object pointer from a from table to a to table.

According to the stated structure, an AP thread is stopped in the procedure for designating non-freeing targets that are objects that can be reached from the AP thread via an object pointer which is in the stack or is in an object. This avoids a situation in which operation of the AP thread causes data in the stack area to change, and therefore prevents the risk of marking processing performed during the procedure becoming wasteful. This prevents lowering of the CPU usage efficiency.

Furthermore, according to the stated structure, since not all AP threads are stopped to perform marking processing, the time for which all threads of the AP are stopped can be prevented from being excessively long. Note that while changes may occur in the state of referencing to objects because not all AP threads are stopped, these changes are dealt with by monitoring whether object pointers have been processing targets of currently-executed threads. Therefore, objects that are accessible from any of the threads are always managed as non-freeing targets.

Furthermore, the detection unit may perform the detection only when the currently-executed thread has not yet been subject to examination processing, and the detection unit may include: a finding sub-unit operable to, when having performed the detection, store, to a working memory area that corresponds to the currently-executed thread, the processing target object pointer and an object pointer in an object that can be reached from the processing target object pointer; and a management sub-unit operable to, while execution of a thread is being stopped by the examination unit, manage, as a non-freeing target, an object that can be reached from the object pointer in the working memory area corresponding to the thread.

According to the stated structure, only while the thread is the target of reference processing described later, in other words, only while the thread is a target of processing that corresponds to marking objects indicated by object pointers stored in the stack or the like that corresponds to the thread, (i) processing is performed for detecting that the object pointer was a processing target of the thread during execution by the interpreter, and (ii) storing the object pointer in the working memory, in other words, storing the object pointer in the memory area of the object reference information. Therefore, after the thread has been a target of reference processing, the thread can operate more quickly because the thread is not subject to detection during execution by the interpreter.

Furthermore, the examination processing may be processing for, when an object indicated by an object pointer in a stack corresponding to the selected thread is found to be accessible, repeatedly performing a procedure of, only when both (a) the accessible object is not already being managed as a non-freeing target and (b) an object pointer exists in the accessible object, further finding that an object indicated by the object pointer in the accessible object is accessible, the selection unit may, after a first selection, further perform selection if, after the examination processing has been performed by the examination unit, any threads out of the plurality of threads remain that have not been subject to the examination processing, and the selection unit may refer to information about the threads, and makes the selection based one or more predetermined thread selection conditions.

The stated structure prevents objects that come under objects managed as non-freeing targets from being made targets of for detection in duplicate. Furthermore, according to this structure which avoids duplicate detection, the possibility is high that the time for referencing processing with respect to threads that are subject to reference processing later will be shorter than for threads that are subject to reference processing earlier. Therefore, by pre-determining thread selection conditions in view of the response performance required by each thread, control can be performed so that, to an extent, each thread is executed exhibiting an appropriate response performance.

Furthermore, the thread selection conditions may include a condition indicating that any threads whose thread state is a wait state are to be selected before any threads whose thread state is a state other than the wait state, and if a thread whose thread state is the wait state exists when making the selection, the selection unit may select the thread whose state is the wait state.

According to the stated structure, the thread that is stopped is a thread in the wait state. This prevents adverse affects on the AP thread currently operating.

Furthermore, the thread selection conditions may include a condition indicating that any threads, whose thread priority level is low, are to be selected before any threads whose thread priority level is high.

According to the stated structure, lowering of execution performance can be prevented to an extent because the possibility is high that reference processing for threads with a high thread priority will be performed in a relatively short amount of time.

Furthermore, the thread selection conditions may include a condition indicating that any threads whose corresponding stack size is small are to be selected before any threads whose corresponding stack size is large.

The stated structure takes of advantage of the tendency for the time required for reference processing to be shorter, the smaller the effective range is of a stack that stores an object pointer to an object that is accessible from a thread. This structure achieves an effect of being able, to an extent, to make the time for which the threads are stopped even between threads, and avoids, to an extent, a situation in which the response performance of a particular thread is especially bad compared to other threads.

Furthermore, the garbage collection system may further include a memory management mechanism that manages memory with use of a memory management unit (MMU), wherein each time an object is to be generated, a memory area corresponding to the object is allocated by the memory management mechanism, and the freeing unit frees the memory areas via the memory management mechanism.

According to the stated structure, memory areas are allocated to objects in the same way as for program data and the like written in a language such as C language, by the memory management mechanism that uses an MMU. Since it is not necessary to allocate a heap area before generating objects, this structure is advantageous compared with a structure in which control is performed to separately manage an unnecessarily large heap area and allocate part of the heap area as a memory area for an object. Furthermore, this structure is advantageous in that memory compaction of a heap area is unnecessary.

BRIEF DESCRIPTION OF THE DRAWINGS

FIG. 5 shows thread information, a stack, and object reference information;

FIG. 6 shows the relationship between reference processing and the state of AP threads;

FIG. 7 shows the contents of thread selection conditions;

DETAILED DESCRIPTION OF THE INVENTION

1. First Embodiment

The following describes a garbage collection (GC) system of the first embodiment of the present invention with reference to the drawings.

<1-1. Structure>

Figure 1:
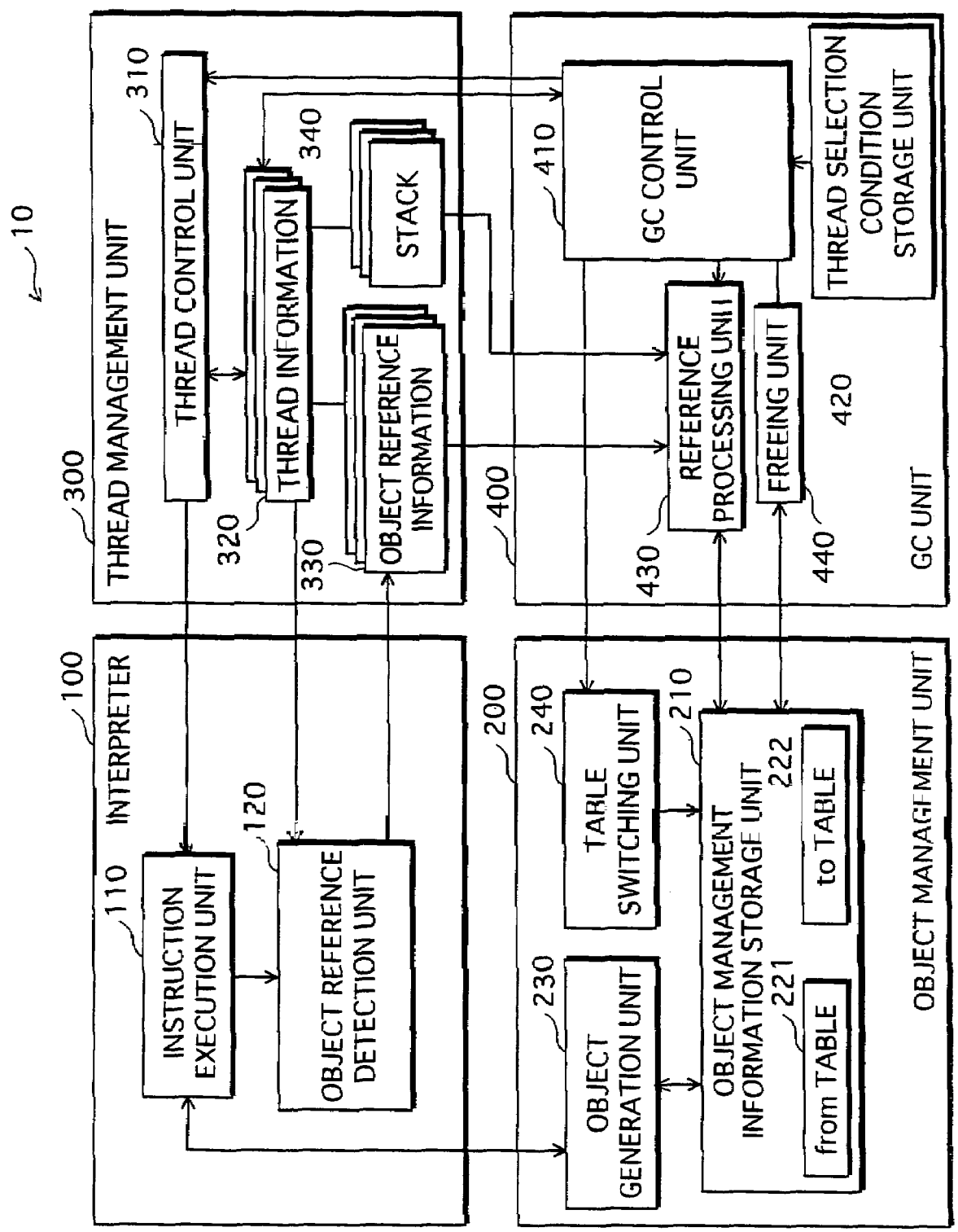
FIG. 1 is a functional block diagram of a GC system of a first embodiment of the present invention.

FIG. 1 is a functional block diagram of the GC system of the first embodiment of the present invention.

A GC system 10 is realized in a computer that includes a CPU, a memory, and so on, by the CPU executing control programs stored in the memory. The GC system 10 includes a general operating system (OS) that performs multithreaded control, and a so-called virtual machine, and is provided as an execution environment for application programs created in languages such as Java.

The GC system 10, as shown in FIG. 1, is composed of an interpreter 100, an object management unit 200, a thread management unit 300, and a GC unit 400.

Here, the interpreter 100 is essentially an interpreter that has a function of executing APs, and includes an instruction execution unit 110 and an object reference detection unit 120.

The object management unit 200 has a function of managing objects, and includes an object management information storage unit 210, an object generation unit 230, and a table switching unit 240. The object management information storage unit 210 is a memory area that corresponds to a "from" table 221, a "to" table 222, and so on.

Note that the "from" table 221 is provided for storing all object pointers corresponding to all objects that exist before GC commences. The "to" table 222 is used to store object pointers of objects that have been marked according to mark-and-sweep. These tables are described in detail later.

The thread management unit 300 has a function of realizing multithreaded control and managing threads. The thread management unit 300 includes a thread control unit 310, and memory areas that correspond to separate thread information 320, object reference information 330, and a stack 340 for each AP thread.

Note that the thread information 320 includes a GC flag for each AP thread that is set ON at the start of overall GC processing and then set to OFF when reference processing with respect to the corresponding AP thread has ended. The reference processing is processing for marking objects, and is mainly for moving, from the "from" table 221 to the "to" table 222, object pointers that are identical in content to object pointers stored in stacks and so on for the purpose of referencing objects.

The GC unit 400 is essentially a garbage collector, and includes a GC control unit 410, a thread selection condition storage unit 420, a reference processing unit 430, and a freeing unit 440. GC that is performed primarily by the GC unit 400 essentially uses the mark-and-sweep method, and successively selects AP threads as a reference processing target, stops the selected AP thread, and after performing reference processing, removes the stop from the thread.

The instruction execution unit 110 of the interpreter 100 has a function of (i) consecutively interpreting an instruction stream that makes up an AP thread, and (ii) when an instruction is an object generate instruction, having the object generation unit 230 generate an object.

The object reference detection unit 120 has a function of, when an instruction in a thread executed by the instruction execution unit 110 is an instruction that processes the object pointer of an object a processing target, storing the object pointer in the memory area of the object reference information 330. Note that the object reference detection unit 120 performs this function only when the GC flag is ON.

The object generation unit 230 of the object management unit 200 has a function of generating an object in the memory by referring to object definition information such as class files and making a request to a conventional OS memory management mechanism for allocation of a memory area of a size necessary for the object. Note that the GC system 10 includes a conventional OS memory management mechanism that uses a memory management unit (MMU) to associate physical memory with logical address spaces, and manage allocation and freeing of the memory. This memory management mechanism has a function of, when a request is received for a memory area of a particular size, managing a memory area of the requested size, from among unused area of the logical address space, as an assigned memory area, and returning the top address of the assigned memory area. Consequently, the object generation unit 230 generates an object in the memory by assigning an area in the logical address space corresponding to the object through the memory management mechanism.

Note that in addition to AP objects created in a language such as Java and executed by the interpreter 100, the logical address space also has arrayed therein program data that is executed under the direct control of a conventional OS, without going through the interpreter 100. In other words, data of programs that have already been put in an executable format by a compiler or the like. This data is referred to as "native data" hereinafter. Programs that are in a format executable without going through the interpreter 100 are allocated memory area via the conventional OS memory management mechanism for arraying native data. Allocation of the memory area for objects generated by the object generation unit 230 is performed in the same manner as arranging native data in the memory area.

Such native data and programs relating to the native data are not directly relevant to the GC operations that are the feature of the GC system 10, and therefore a detailed description thereof is omitted from the present description.

Note that the term "AP thread" used above refers to a thread that is a unit of execution of an AP executed via the interpreter unit 100, in other words, a thread other than a unit of execution of a program relating to native data. Furthermore, the term "object" used here does not include native data.

The table switching unit 240 has the function of causing an effect that is equivalent to the contents of the "from" table 221 being instantly exchanged with the contents of the "to" table 222, by exchanging a pointer used to indicate the "from" table 221 with a pointer used to indicate the "to" table 222.

The thread control unit 310 of the thread management unit 300 performs multithreaded control, and serially executes threads including AP threads that make up AP and GC processing threads. That is, the thread control unit 310 switches and executes threads at minute time intervals. Note that the thread management unit 300 also serially executes program threads of native data. However, since this multithreaded control function is essentially a function in conventional OSs and the like, and is not directly relevant to the GC operations that are the feature of the GC system 10, the present description focuses primarily on processing of AP threads and GC threads only.

The thread selection storage unit 420 of the GC unit 400 is a memory area that stores thread selection conditions showing conditions for selecting an AP thread as a target of reference processing.

The reference processing unit 430 has the function of performing reference processing. The freeing unit 440 has the function of freeing objects that have not been marked. In other words, the freeing unit 440 frees memory area corresponding to an object indicated by an object pointer that exists in the "from" table 221 at the end of GC. Freeing of the memory area is realized by designating the object pointer, in other words the logical address of the object, and making a freeing request to the conventional OS memory management mechanism that uses an MMU. Note that, in response to the request to free the designated logical address, the conventional OS memory management mechanism included in the GC system 10 manages the area allocated to the in association with the logical address as an unused memory area that can be newly allocated when it is necessary to allocate memory area.

Furthermore, the GC control unit 410 has the function of executing GC control processing. Specifically, the GC control unit 410 selects one AP thread as a target of reference processing by referring to the thread selection conditions. After having the thread control unit 310 stop the selected AP thread, the GC control unit 410 then has the reference processing unit 430 perform reference processing based on the stack and object reference information corresponding to the AP thread. Next, after having the thread control unit 310 release the stop on selected AP thread, the GC control unit 410 selects the next AP thread. The GC control unit 410 repeats the described procedure until no unprocessed AP threads exist, and then has the freeing unit 440 free objects that have not been marked.

<1.2 Data>

The following describes data treated in the GC system 10.

Figure 2:
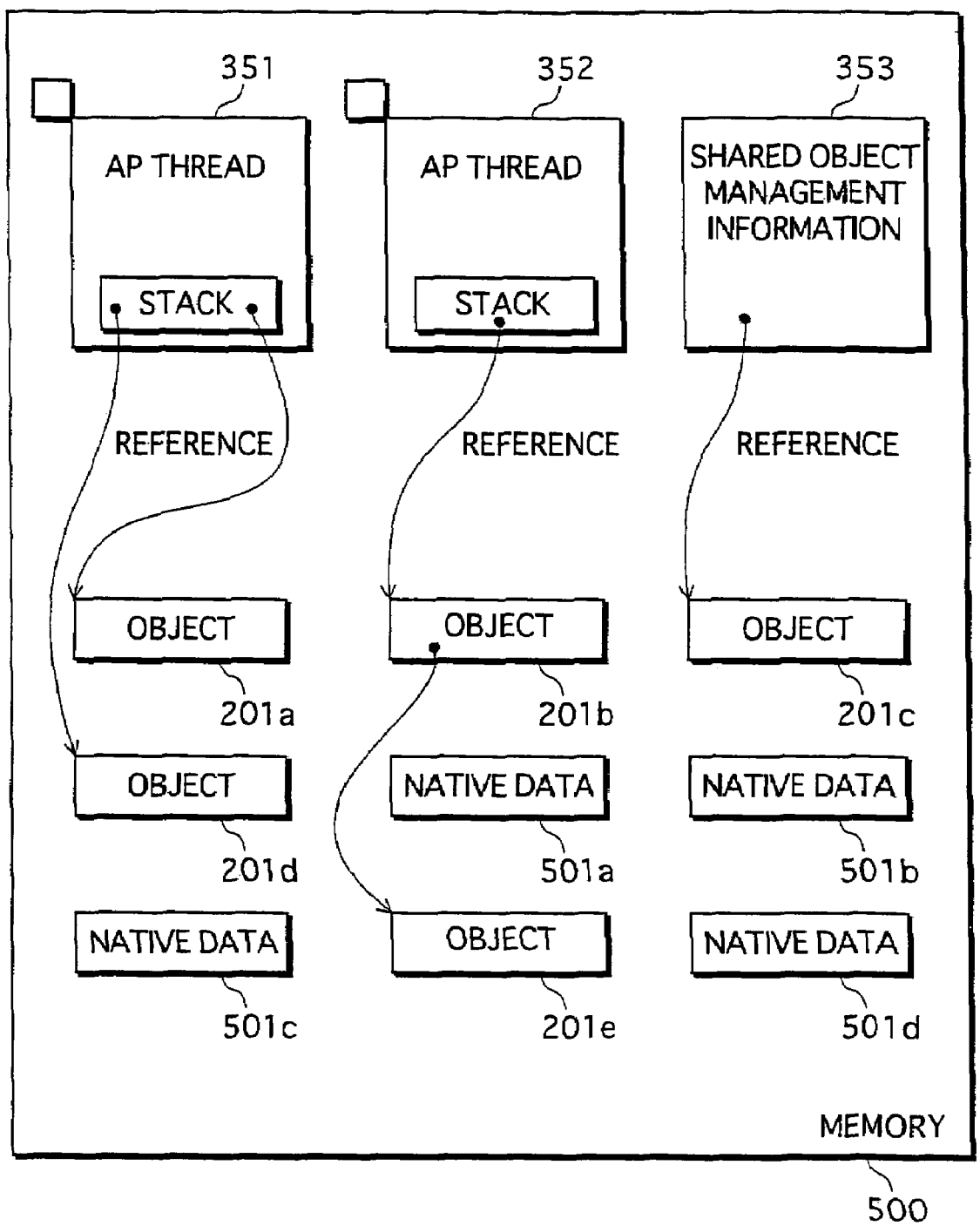
FIG. 2 shows an example of the relationship between objects and object pointers.

FIG. 2 shows an example of the relationship between objects and object pointers.

In the drawing, object pointers are expressed as small, filled-in circles.

Object pointers which indicate an object, in other words, which indicate an address location of an object arranged in the logical address space corresponding to the memory 500, may exist in either an object, a stack, or shared object management information 353. Here, the shared object management information 353 is data that includes an object pointer group that indicates an object group allocated, because it is necessary in a virtual machine as an AP execution environment.

In the example in FIG. 2, the object pointer in the shared object management information 353 indicates an object 201c.

Furthermore, one object pointer in the stack that corresponds to an AP thread 351 indicates an object 201a, in other words the contents of the memory address of the object 201a. The other object pointer in the stack that corresponds to the AP thread 351 indicates an object 201d. Therefore, the AP thread 351 is able to access the object 201a and the object 201d during execution by referencing these object pointers.

Furthermore, the object pointer in the stack corresponding to the AP thread 352 indicates an object 201b, and an object pointer that indicates an object 201e is included as data in the object 201b. Therefore, the AP thread 352 is able to access the object 201e by tracing these object pointers.

Furthermore, FIG. 2 shows that, together with the objects 201a to 201e that correspond to APs created in a language such as Java executed via the interpreter 100, native data 501a to sold whose memory area is also allocated by the OS memory management mechanism exists in the memory 500. Areas are allocated to this native data 501a to 501d also by the memory management mechanism of the OS. In other words, the objects 201a to 201e are not put together into a type of heap area, but are assigned respective, separate areas by the OS memory management mechanism in the same way as native data.

Note that although not shown in FIG. 2, thread information 320, a stack 340, and object reference information 330 are also allocated areas in the memory 500. Furthermore, the object reference information storage unit 210 corresponds to part of the memory 500. Note that the program portion of the AP executed via the interpreter 100 and the program portion that accesses the native data may be stored in a readable/writable memory (RAM), or in a read only memory (ROM).

Figure 3:
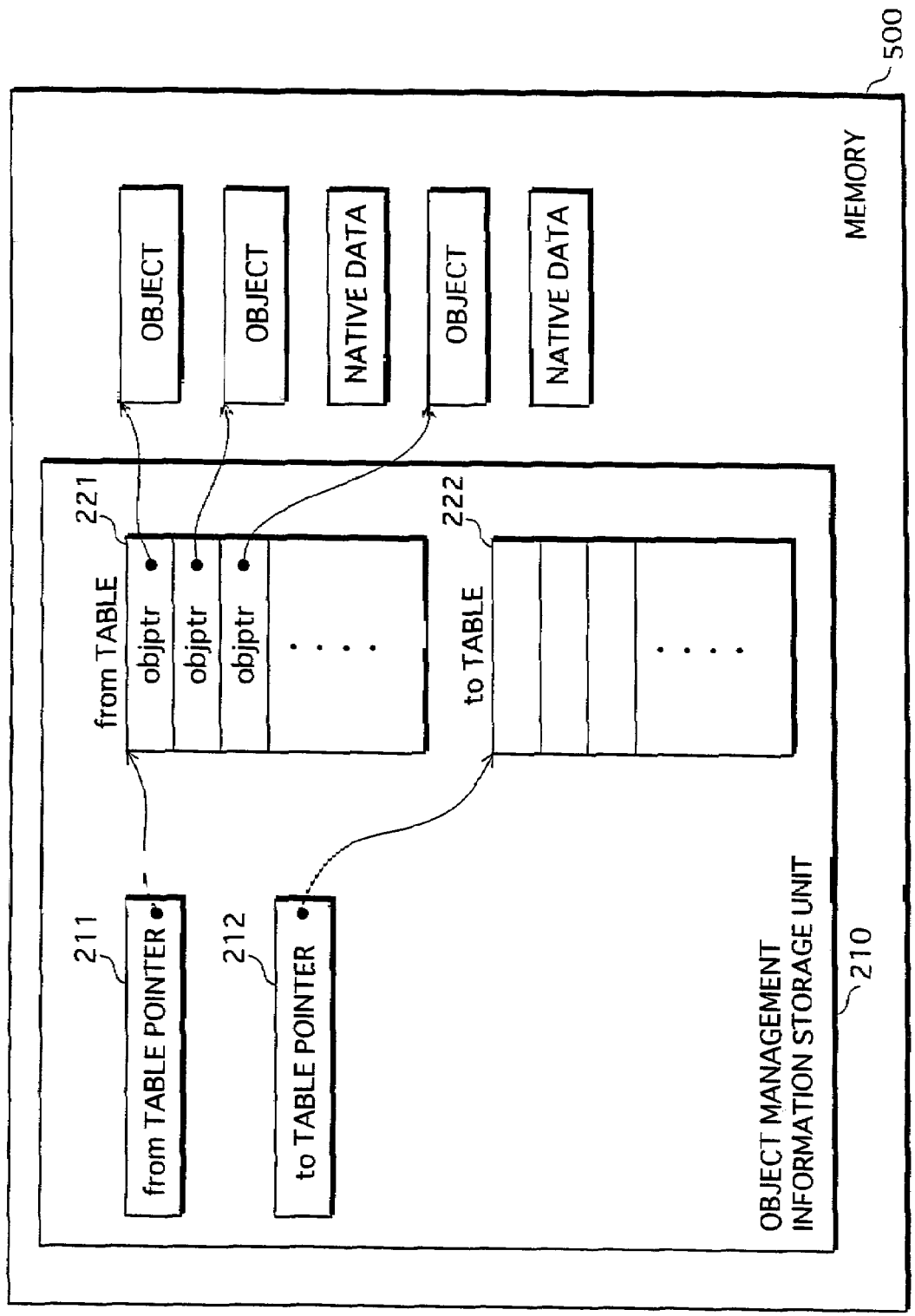
FIG. 3 shows a "from" table and a "to" table.

FIG. 3 shows the from table and the to table.

In the object management information storage unit 210 of the memory 500, two data areas are provided that are for storing a sufficient number of object pointers or null values. A "from" table pointer 211 and a "to" table pointer 212 also exist in the object management information storage unit 210. The "from" table pointer 211 indicates one of the two tables, and the "to" table pointer 212 indicates the other of the two tables. Here, the table presently indicated by the "from" table pointer 211 is called the "from" table 221, and the table presently indicated by the "to" table pointer 212 is called the "to" table 222.

At the point when GC commences, the "from" table 221 stores object pointers that correspond all objects that exist at that time.

Furthermore, the "to" table 222 stores object pointers that are moved from the "from" table 221 during reference processing. Note that when an object pointer is moved from the "from" table 221 to the "to" table 222, the contents of the memory of the location in the "from" table 221 at which the moved object was stored are made a null value.

Figure 4A:
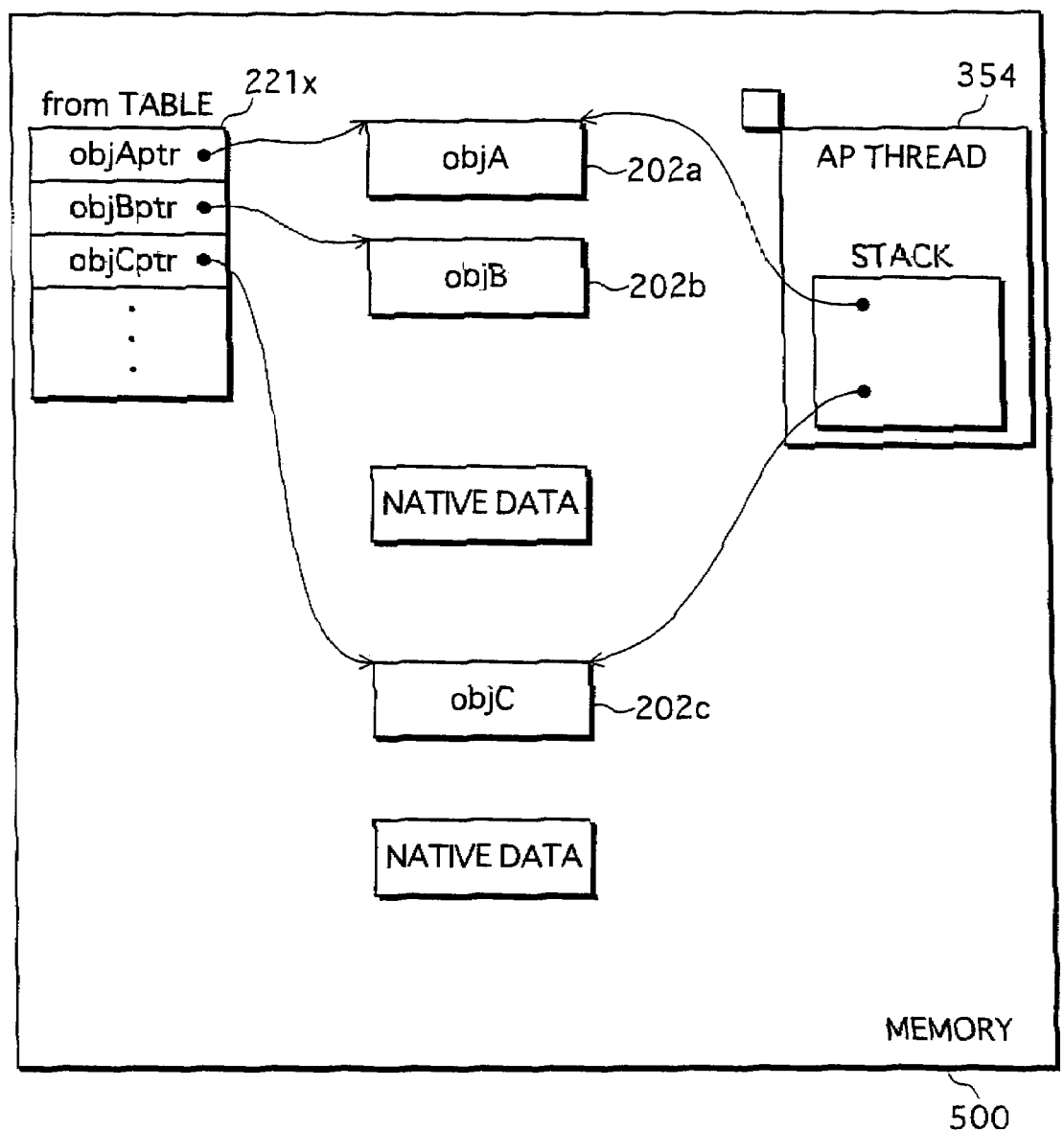
FIG. 4A shows the state of the "from" table before reference processing.
Figure 4B:
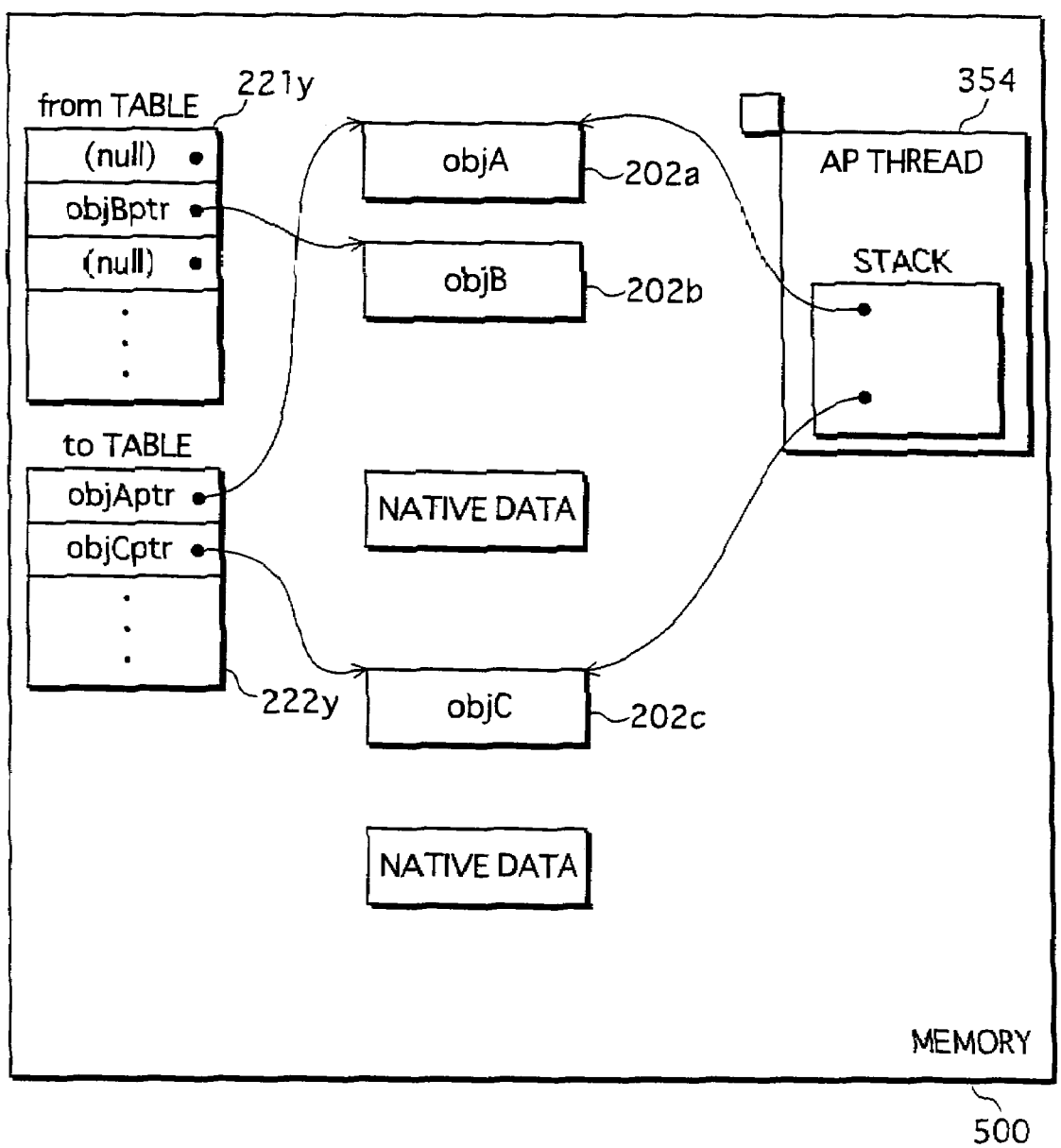
FIG. 4B shows the state of the "from" table and the "to" table after reference processing.

FIG. 4A and FIG. 4B show changes in the contents of the "from" table 221 and the "to" table 222 due to reference processing. FIG. 4A shows the state before reference processing starts, and FIG. 4B shows the state after reference processing.

In FIG. 4A, a "from" table 221x before the start of reference processing includes object pointers that indicate objects objA 202a, objB 202b, and objC 202c, respectively. Note that FIG. 4A and FIG. 4B also express that both objects and native data exist in the memory 500.

When reference processing is subsequently performed with an AP thread 354 as a target, data having the same value as the object pointer included in the stack of the AP thread is moved from the "from" table 221 to the "to" table 222. The result of this move is the state shown in FIG. 4B. The place where the object pointer indicating objA 202a existed and the place where the object pointer indicating objC 202c existed in the "from" table 221y are updated to null values, and the object pointer indicating objA 202a and the object pointer indicating objC 202c are stored in the "to" table 222y.

FIG. 5 shows thread information, stacks, and object reference information.

Thread information 320 is generated each time an AP thread is generated for that AP thread, and includes information about that AP thread. Specifically, the thread information 320 includes a state 321, a priority level 322, a stack pointer 323, a GC start stack pointer 324, aGC flag 325, an object reference information top pointer 326, and an object reference information current pointer 327. Note that when an AP thread is generated, a memory area is allocated not only in the thread information 320, but also in the stack 340.

The state 321 in the thread information 320 is information that shows the state of the thread for the purpose of multithreaded control, and indicates either a wait state, a run state, or a ready state.

The priority level 322 is information that shows the priority level of the thread. The priority level is set, for example, by a designation received from the AP when the thread is generated. Note that in multithreaded control, if a high priority level thread is in the ready state, the high priority thread is put into a run state before lower priority level threads.

The stack pointer 323 shows the end of the range of currently effective data in the stack relating to the thread. Note that in multithreaded control, when a thread is switched from the run state to another state, in other words to a stopped state, the value stored in a predetermined register that has indicated the stack pointer until that point in time is stored in the stack pointer 323, and when the thread is switched to the run state, the value in the stack pointer 323 is set in the predetermined register.

The GC start stack pointer 324 shows the end of the range of effective data in the stack at the time of starting GC.

The GC flag 325 is set to ON at the overall start of GC processing, and is set to OFF when reference processing with respect to the AP thread has ended.

The object reference information top pointer 326 shows the head of the memory area of the object reference information corresponding to the AP thread, and is set at the time of allocating memory area during AP thread generation.

Furthermore, the object reference information current pointer 327 is information showing a location where the object reference detection unit 120 is to store the next object pointer in the memory area of the object reference information corresponding to the AP thread. The object reference information current pointer 327 is referenced and updated by the object reference detection unit 120.

FIG. 6 shows the relationship between reference processing and the state of an AP thread.

The GC thread 356 is a thread for executing GC by the GC control unit 410. The processing that the GC thread 356 performs is GC successive reference processing with respect to the AP threads. Here, an example is shown of reference processing being performed with respect to AP thread 355a, AP thread 355b, and AP thread 355c, in the stated order.

The AP thread 355a has been subject to reference processing, and is being executed. Here, "being executed" means that the thread is not in a sleep state, in other words, not in a stopped state, and continuously changes state instantaneously to a run state or a ready state, for example.

The AP thread 355b is in a state of being subject to reference processing, and is stopped. Reference processing is performed by forcedly putting the AP thread into a stopped state, and referencing the stack and object reference information.

The AP thread 355c is in a state of not yet having been subject to reference processing, and is being executed.

FIG. 7 shows the contents of the thread selection conditions.

Thread selection conditions 421 is information that serves as a basis for judging which AP thread to give preference to as a target of reference processing, and is composed of a thread state 422, a thread priority level 423, and a stack size 424.

The thread state 422 is information showing which state of AP threads are to be given preference. The example in FIG. 7 shows that AP threads in the wait state are to be given preference over AP threads in states such as the run state.

The thread priority level 423 is information showing whether the AP thread to be selected as the target of reference processing should be one having a high priority level or one having a low priority level. The example in FIG. 7 shows that AP threads having a low priority level are selected preferentially.

The stack size 424 is information showing whether an AP thread should be selected with preference given to AP threads whose corresponding stack area has a large effective range or to AP threads whose corresponding state area has a small effective range. The example in FIG. 7 shows that AP threads whose corresponding stack area has a small effective range are to be selected preferentially.

<1-3. Operations>

The following describes operations of the GC system 10.

Figure 8:
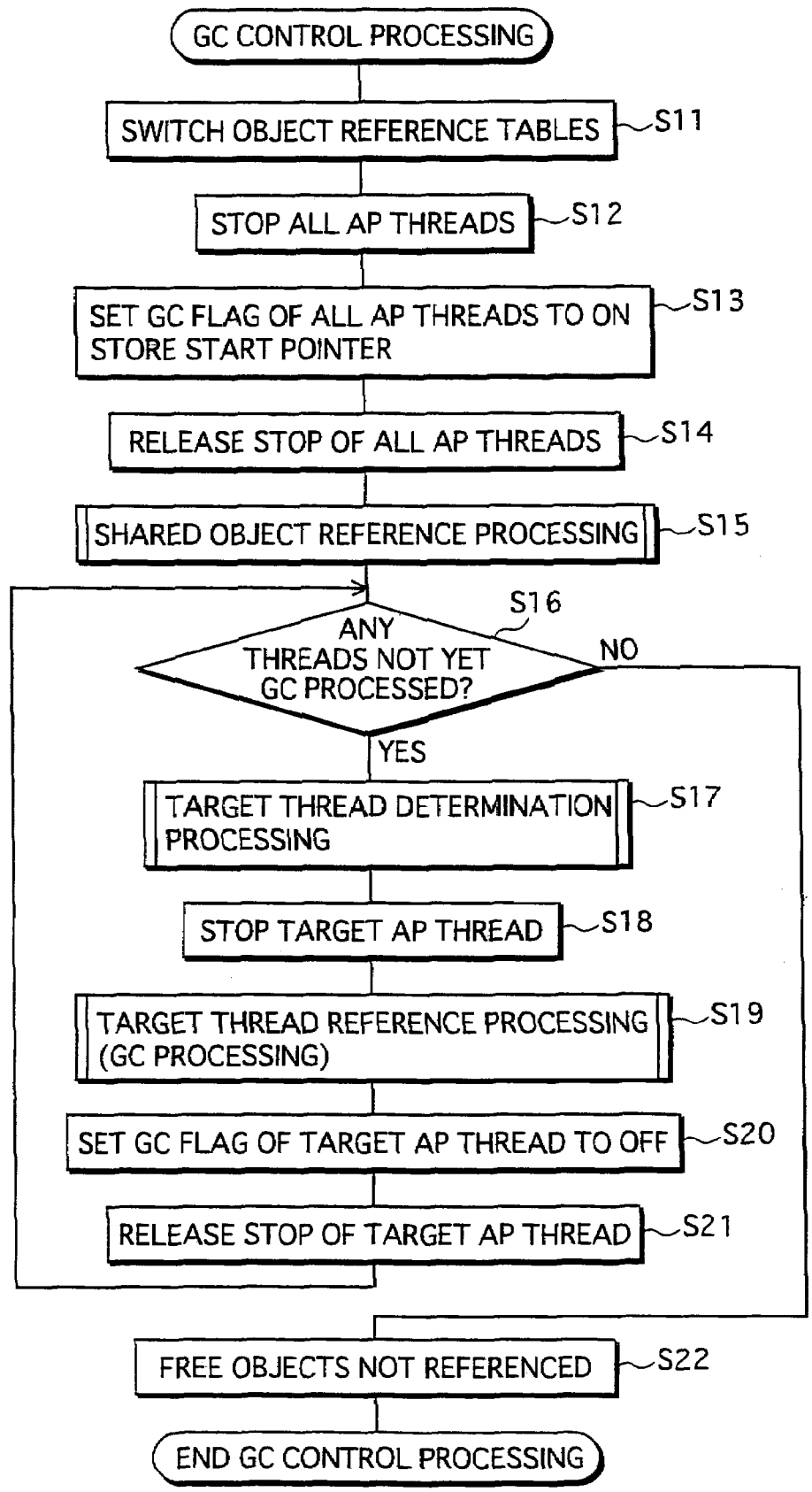
FIG. 8 is a flowchart showing GC control processing.

FIG. 8 is a flowchart showing GC control processing.

GC control processing is performed in a fixed cycle based on a timer.

The GC control unit 410 first switches the contents of the "from" table 221 and the "to" table 222 by exchanging the contents of the "from" table pointer 211 with the contents of the "to" table pointer 212 (step S11). The resulting state is that object pointers indicating all objects that are currently not freed are stored in the from table.

Next, the GC control unit 410 (i) has the thread control unit 310 stop all AP threads (step S12), (ii) sets the GC flag 325 in the thread information for each AP thread to ON, and (iii) sets the current stack pointer as the GC start stack pointer 324 in the thread information (step S13). The GC control unit 410 then has the thread control unit 310 release the stop from all the AP threads (step S14). At step S13, with respect to each AP thread, the GC control unit 410 further allocates a memory area for the object reference information, and sets an object pointer that indicates the top of that memory area in the object reference information top pointer 326 and the object reference information current pointer 327.

Note that the thread control unit 310 stops and releases the stop on threads in the same way as a conventional OS multithreaded control mechanism. This stopping of a thread is control for putting a thread into a stopped state (i.e., a sleep state), and this releasing of stopping of a thread is control for releasing the sleep state, and returning the thread to a ready state.

After step S14, the GC control unit 410 performs shared reference processing for marking objects that can be reached by tracing object pointers in the shared object management information 353 (step S15). The GC control unit 410 determines whether or not any non-GC processed threads (i.e., AP threads that have not yet been selected as a target of reference processing), exist (step S16). Note that shared object reference processing is described later.

When any non-GC processed threads are determined to exist at step S16, the GC control unit 410 performs target thread determination processing for selecting an AP thread as the target of reference processing (step S17), has the thread control unit 310 stop the selected AP thread (step S18), executes target thread reference processing with respect to the contents of the selected AP thread (step S19), sets the GC flag 325 of the selected AP thread to OFF (step S20), has the thread control unit 310 release the stop from the selected AP thread (step S21), and returns to the judgment at step S16. Note that the target thread determination processing and the target thread reference processing are described later. Furthermore, directly after step S20, the GC control unit 410 frees the memory area of the object reference information corresponding to the target AP thread.

Furthermore, when no non-GC processed threads are determined to exist at step S16, the GC control unit 410 has the freeing unit 440 free objects that are not marked (step S22), and ends the processing. At step S22, the freeing unit 440 frees the memory areas corresponding to objects that have not been moved to the to table according to reference processing (i.e., objects that are indicated by object pointers remaining in the "from" table 221). Here, freeing corresponds to the object generation unit 230 securing a memory area for allocating to an object for object generation based on an OS memory management mechanism that uses MMU, and denotes freeing of the allocated memory area. Note that a memory area that has been freed is able to be newly assigned as a storage area for an object or native data.

Figure 9:
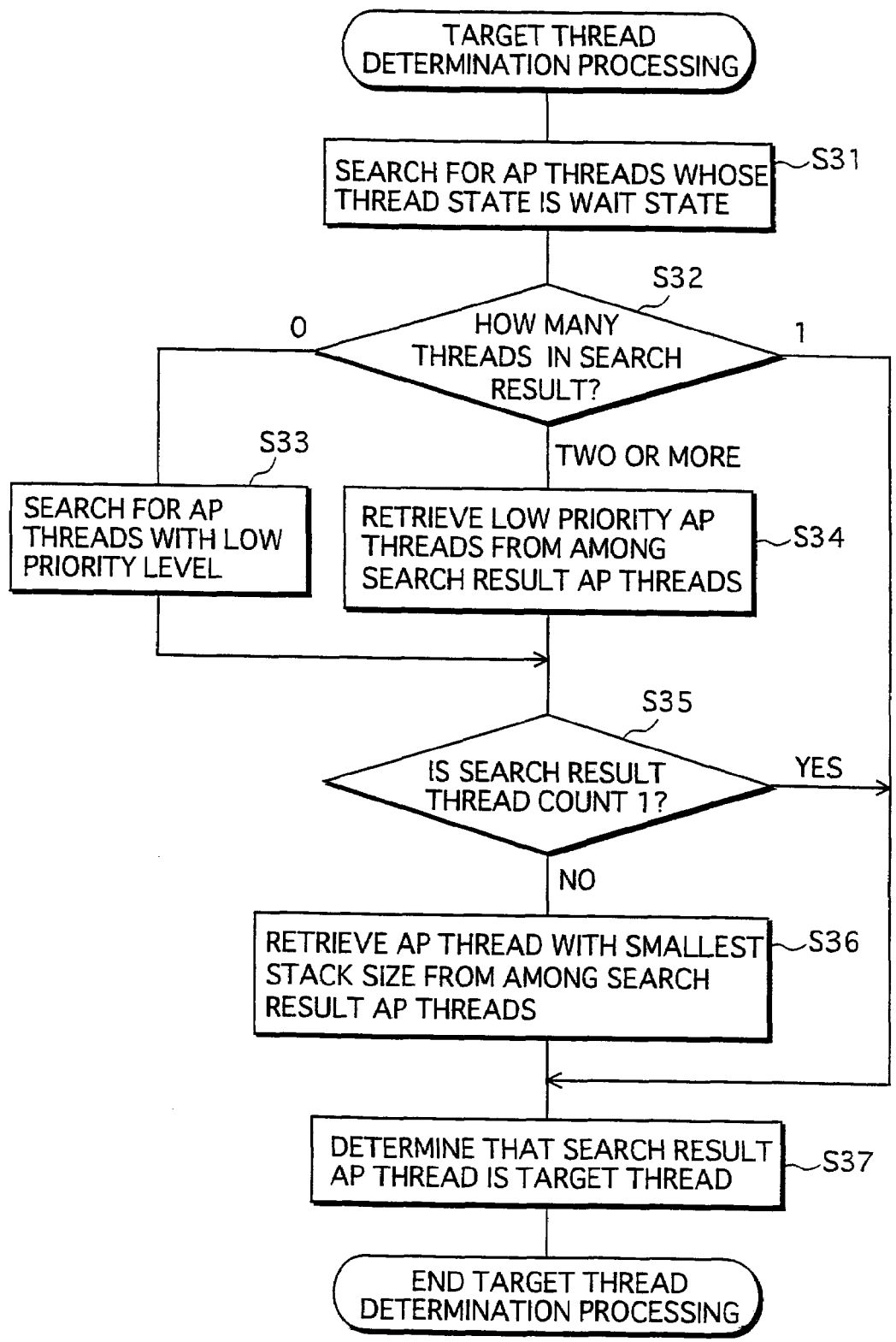
FIG. 9 is a flowchart showing target thread determination processing.

FIG. 9 is a flowchart showing target thread determination processing.

The GC control unit 410 refers to the thread selection conditions 421 in the thread selection condition information unit 420 to perform target thread determination processing.

First, the GC control unit 410 refers to the thread information corresponding to each AP thread, and searches for AP threads whose state 321 is the wait state (step S31). The GC control unit 410 determines the number of threads (thread count) found as a search result (step S32), and if the thread count is "one", determines the found AP thread to be the reference processing target thread (step S37), and ends the target thread determination processing.

Furthermore, if the thread count of the search result at step S23 is "zero", the GC control unit 410 searches for AP threads having the lowest priority level 322 (step S33), and judges whether or not the thread count of the search result is "one" (step S35). Furthermore, if the thread count of the search result at step S32 is "two or more", the GC control unit 410 narrows down the search result by searching for the AP thread that has the lowest priority level 322 among the AP threads of the search result (step S34), and judges whether or not the thread count of the search result is "one" (step S35).

When the thread count is judged to be "one" at step S35, the GC control unit 410 selects the AP thread of the search result as the target thread of AP reference processing (step S37), and ends the target thread determination processing.

Furthermore, if the thread count of the search result is judged not to be "one" at step S35, in other words, if a plurality of threads having the lowest priority level exists, the GC control unit 410 searches for the AP thread having the smallest stack size among the AP threads of the search result (step S36), determines the AP thread having the smallest stack size to be the target of reference processing (step S37), and ends the target thread determination processing.

Figure 10:
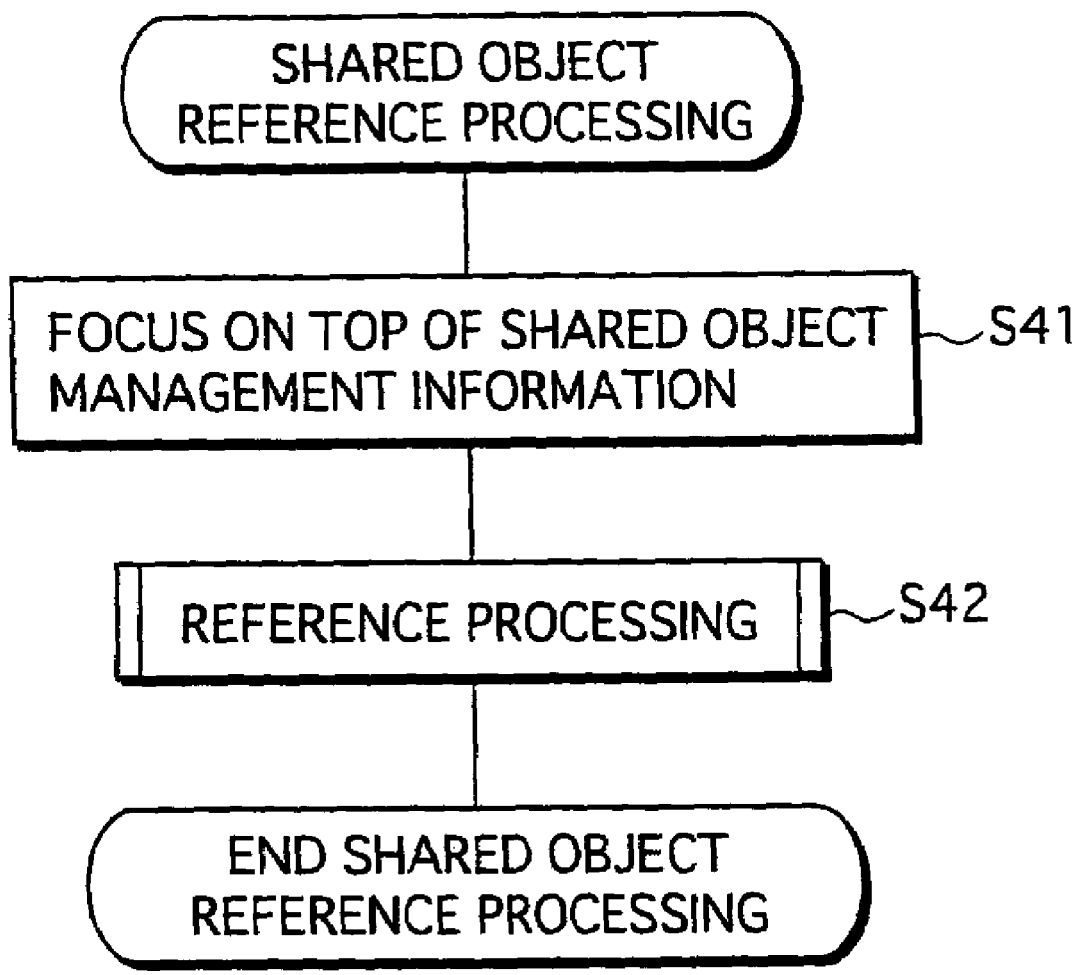
FIG. 10 is a flowchart showing shared object reference processing.

FIG. 10 is a flowchart showing shared object reference processing.

The GC control unit 410 focuses on the top object pointer of the shared object management information 353 that includes an object pointer group (step S41), and, by having the reference processing unit 430 perform reference processing (step S42), marks all objects in the object group that are assigned because they are necessary in a virtual machine that operates as an AP execution environment.

Figure 11:
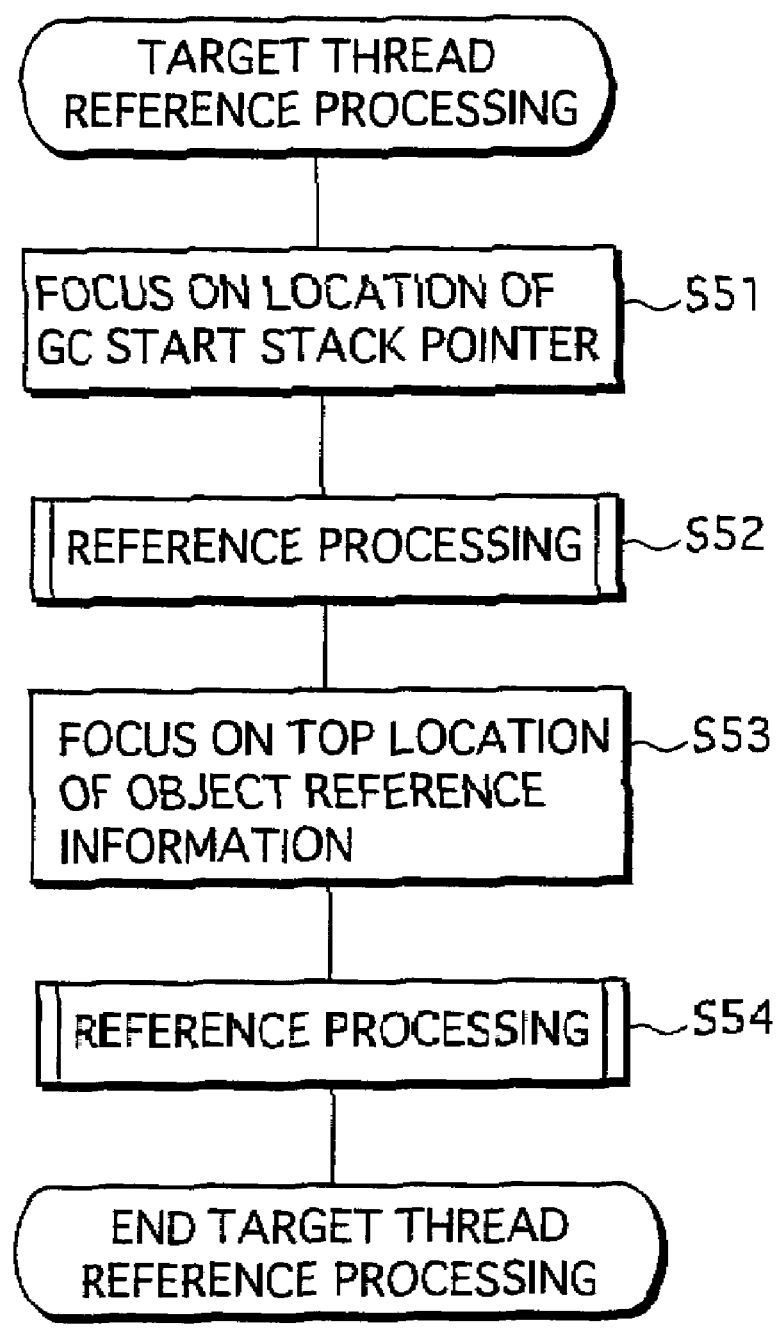
FIG. 11 is a flowchart showing target thread reference processing.

FIG. 11 is a flowchart showing target thread reference processing.

The GC control unit 410 focuses on the location indicated by the GC start stack pointer 324 corresponding to the target thread (step S51), and, by having the reference processing unit 430 perform reference processing (step S52), marks all objects that can be reached from object pointers in the stack area. Note that since the point in time at which the GC control processing (see FIG. 8) starts and the point in time at which the target thread reference processing start are different, the contents of the location indicated by the GC start stack pointer 324 and the contents of the subsequent locations are different to when GC started. However, according to the subsequent step S53 and step S54, all objects that can be reached from object pointers that have changed according to operation of the target thread are marked. Therefore, while this may result in excessive marking, it prevents a situation in which some objects, despite being referenced, fail to be marked.

Next, the GC control unit 410 focuses on the location indicated by the object reference information top pointer 326 (step S53), has the reference processing unit 430 perform reference processing (step S54), and ends the target thread reference processing.

Figure 12:
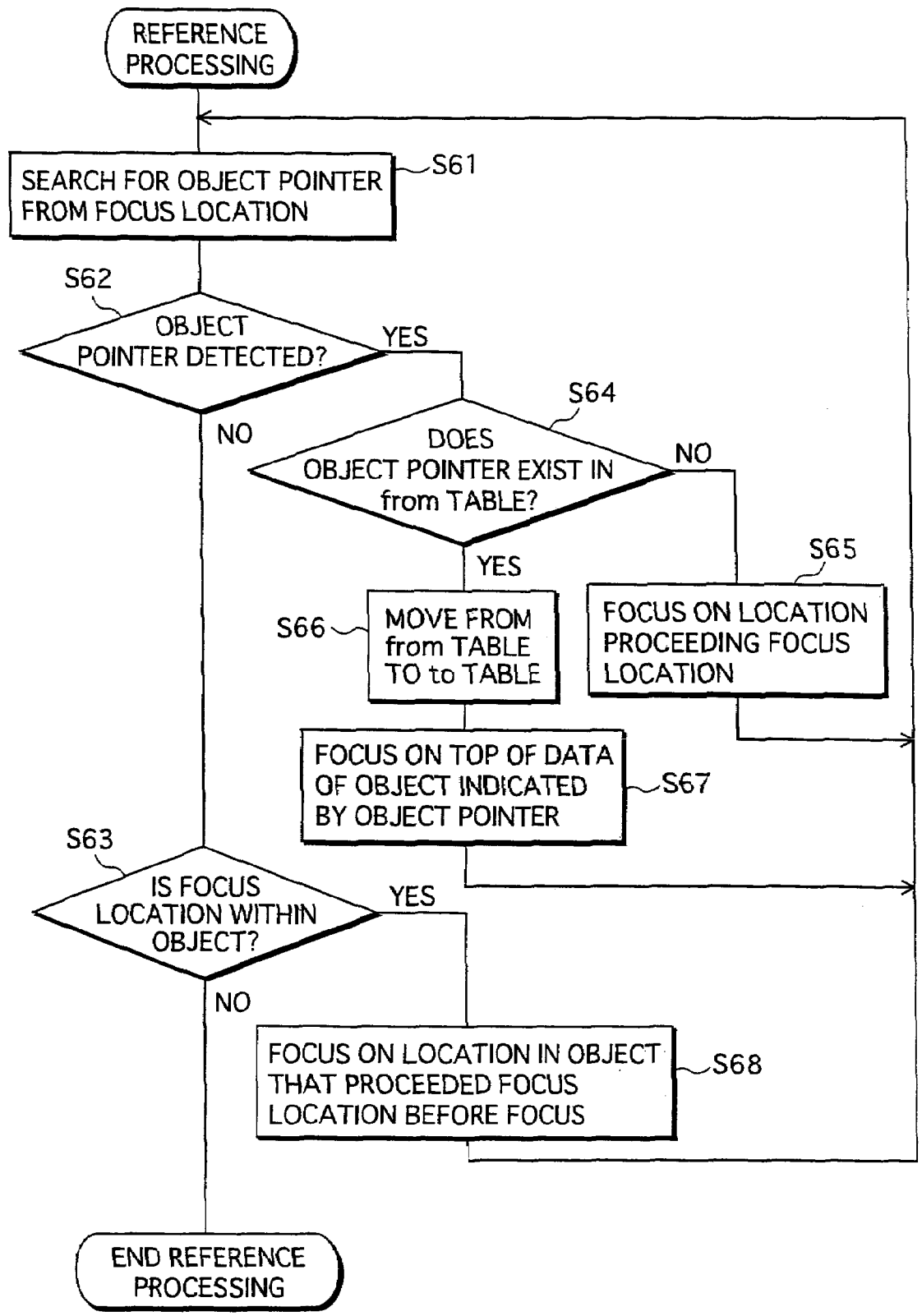
FIG. 12 is a flowchart showing reference processing.

FIG. 12 is a flowchart showing reference processing.

The reference processing unit 430 searches for an object pointer from the memory location being focused on (step S61), judges whether an object pointer has been detected (step S62), and when an object pointer has been detected, judges whether an object pointer having the same value as the detected object pointer exists in the "from" table 221 (step S64). If such as object pointer exists in the "from" table 221, the reference processing unit 430 copies the object pointer from the "from" table 221 to the "to" table 222, and records a null value in the location at which the object pointer existed in the "from" table 221 (step S66). The reference processing unit 430 then focuses on the top of the data of the object that the object pointer indicates (step S67), and returns to step S61.

Furthermore, if it is judged at step S64 that such an object pointer does not exist in the "from" table 221, the reference processing unit 430 focuses on the next location after the location currently being focused on, since the object pointer has already been moved from the "from" table 221 to the "to" table 222 (step S65), and returns to step S61. The combination of step S65 and step S61 realizes the following: successive searching for object pointers in the shared object management information 353; successive searching for object pointers in the stack; successive searching for object pointers in the object reference information; and successive searching for object pointers that are data members of a particular object.

Furthermore, when it is judged at step S62 that an object pointer was not able to be detected, the reference processing unit 430 judges whether or not the focus location is within an object (step S63). Note that not being able to detect an object pointer means (a) if the focus location is in the shared object management information 353, that an object pointer is unable to be detected in the shared object management information 353, (b) if the focus location is within the stack, an object pointer is unable to be detected in the stack, (c) if the focus location is within the object reference information, an object pointer is unable to be detected in the object reference information, and (d) if the focus point is within an object, an object pointer not being able to be found in that object.

When the focus location is judged to be within an object at step S63, the reference processing unit 430 next focuses on the location that proceeded the present focus location before the present focus location was focused on (step S68), and then returns to step S61. According to this step S68, the reference processing unit 430 focuses on the location in the object that follows the object pointer that was being focused on before step S67.

Furthermore, when it is judged at step S63 that the focus location is not within an object, the reference processing unit 430 ends the reference processing.

Figure 13:
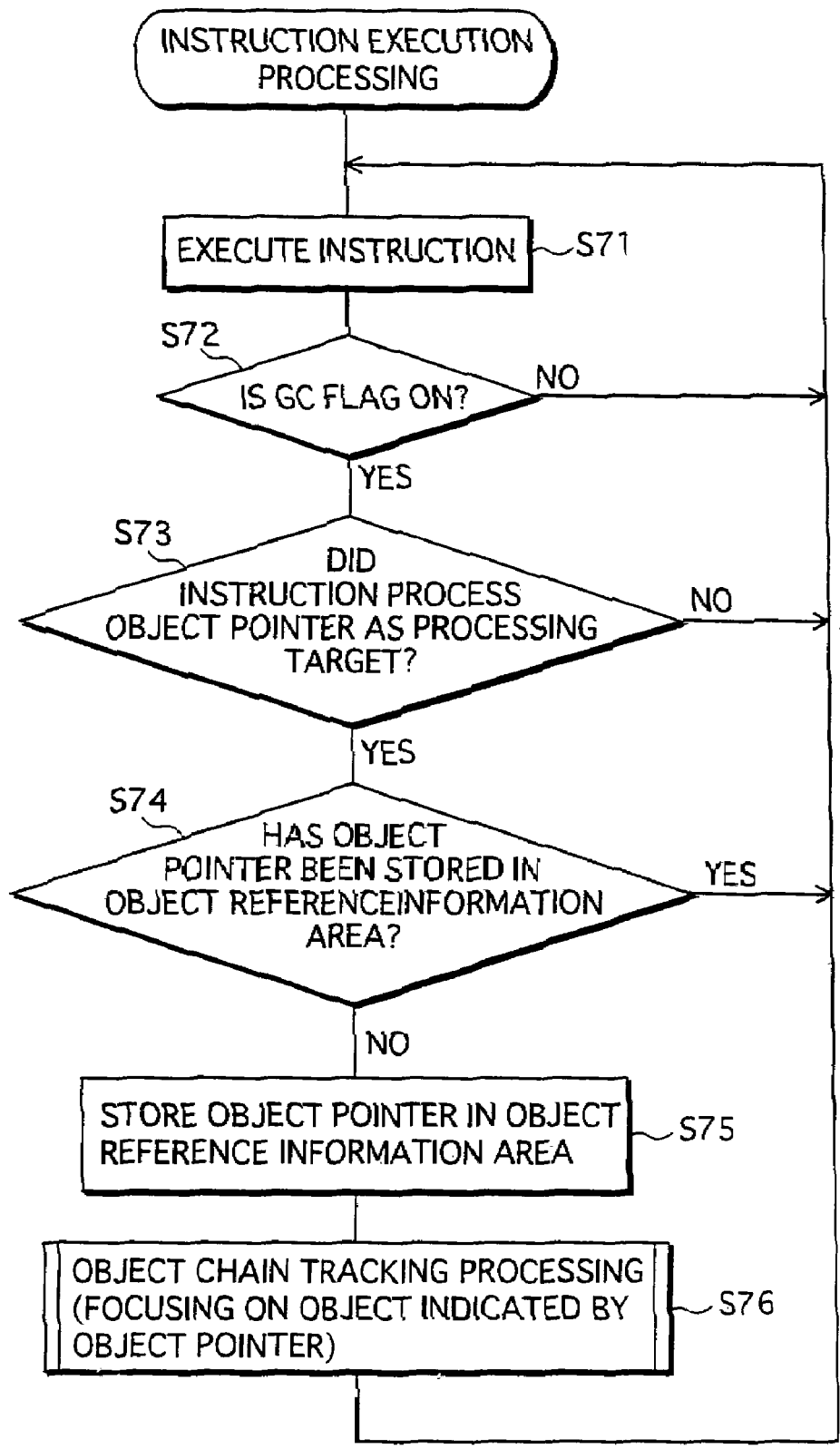
FIG. 13 is a flowchart showing instruction execution processing.

FIG. 13 is a flowchart showing instruction execution processing.

The instruction execution unit 110 of the interpreter 100 performs instruction execution processing by successively interpreting and executing instruction descriptions in the program of the AP thread that is in the run state.

First, the instruction execution unit 110 interprets and executes the instruction in the current execution location of the AP thread (step S71), and the object reference detection unit 120 judges whether or not the GC flag 325 in the thread information corresponding to the AP thread is ON (step S72). If the GC flag 325 is not ON, the instruction execution unit 110 interprets and executes the next instruction (step S71).

If the GC flag is judged to be ON at step S72, the object reference detection unit 120 judges whether the instruction executed by the instruction execution unit 110 at step S71 was an instruction that processes an object pointer as a processing target (step S73), and if not, the instruction execution unit 110 interprets and executes the next instruction (step S71). Note that an instruction that processes an object pointer as a processing target is (i) an instruction that instructs a computation for copying the object pointer in a stack to a object, or (ii) an instruction that instructs a computation for copying the object pointer in the object to another object.

When it is judged at step S73 that the instruction was an instruction that processes an object pointer as a processing target, the object reference detection unit 120 judges whether data of the same value as the object pointer has been stored in the object reference information area (step S74), and if so, the instruction execution unit 110 interprets and executes the next instruction (step S71).

If it is judged at step S74 that data of the same value as the object pointer has not been stored in the object reference information area, the object reference detection unit 120 (i) stores the object pointer at the location in the object reference information that is indicated by the object reference information current pointer 327 (step S75), (ii) focuses on the object indicated by the object pointer, and (iii) performs object chain trace processing (step S76). The instruction execution unit 110 then interprets and executes the next instruction (step S71).

Note that when the instruction executed at step S71 is an instruction for generating an object, the instruction execution unit 110 instructs the object generation unit 230 to generate an object. Having received this instruction, the object generation unit 230 generates the object, returns the object pointer indicated by the object to the AP thread, and sets a copy of the object pointer in the to table.

Figure 14:
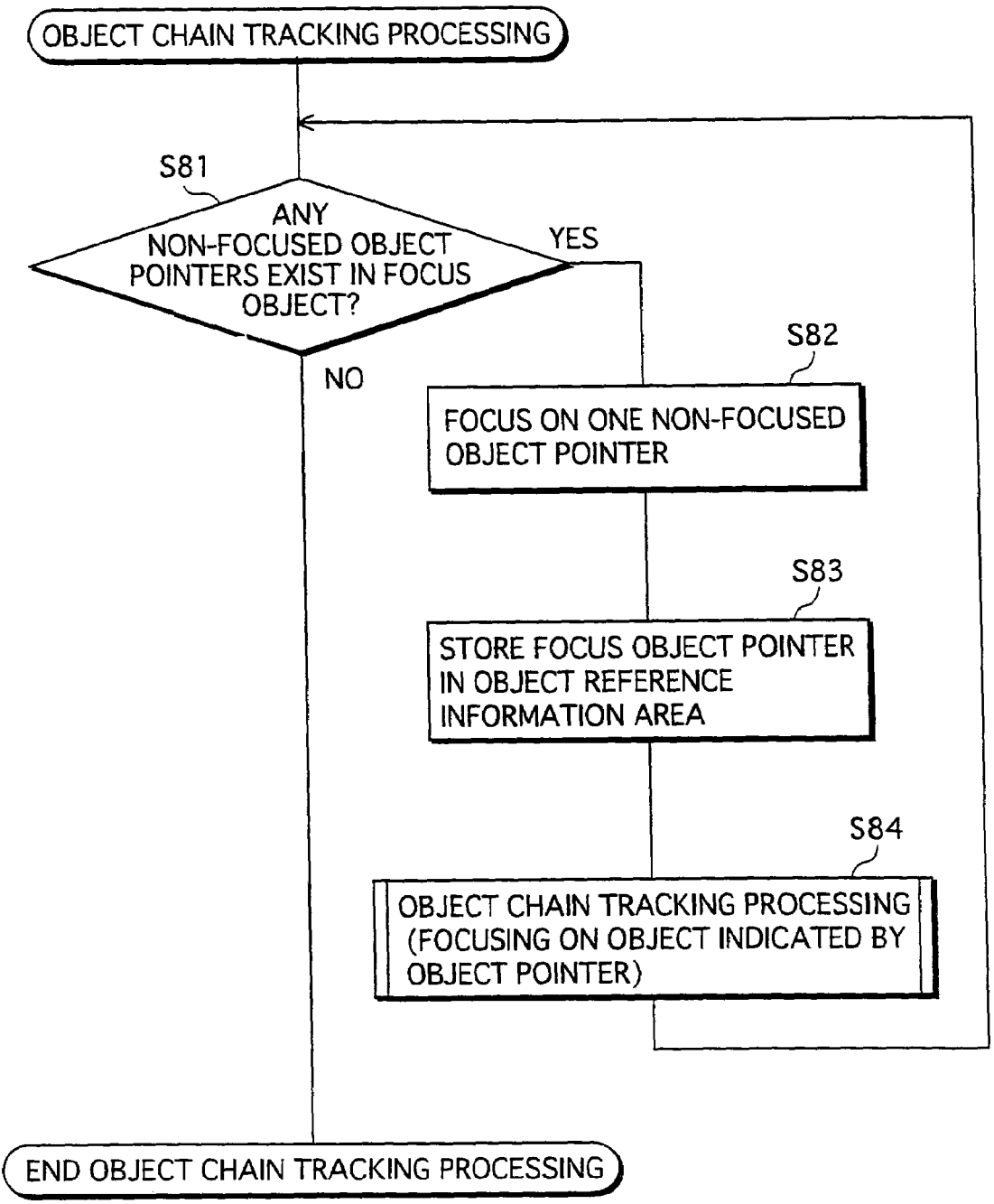
FIG. 14 is flowchart showing object chain tracing processing.

FIG. 14 is a flowchart showing object chain trace processing.

The object reference detection unit 120 judges whether or not any non-focused object pointers (object pointers that have not yet been focused on) exist in the object that is being focused on (step S81), and when any non-focused object pointers exist, focuses on one of the non-focused object pointers (step S82), and stores the object pointer that is being focused on to the memory area of the object reference information (step S83). The object reference detection unit 120 then focuses on the object indicated by the object pointer being focused on, and further performs the object chain processing at steps S81 to S84 (step S84). Note that after storing an object pointer in the memory area of the object reference information, the object reference detection unit 120 advances the object reference information current pointer an amount corresponding to the size of the object pointer.

Furthermore, when it is judged at step S81 that no non-focused object pointers exist in the object being focused on, the object reference detection unit 120 ends the object chain trace processing.

Consequently, the result of instruction execution processing and object chain processing is that, when the GC flag 325 is ON, object pointers that could be reached from the object pointer that is the processing target when that object pointer was the processing target are stored in a memory area in the object reference information.

Note that the processing of the above-described steps S72 to S76 and steps S81 to S84 is performed for the following reason. There are cases in which an object indicated by an object pointer becomes inaccessible from a particular AP thread due to the AP thread executing computations that process the object pointer as a processing target. Specifically, the object indicated by the object pointer may become inaccessible from the AP thread when, according to AP thread operations, (a) the object pointer is cleared, (b) the contents of the object pointer are updated, or (c) the object pointer was in an effective range of the stack area but, due to the stack pointer being updated, is no longer in the effective range and essentially becomes inaccessible from the AP thread. In such cases, if the AP thread has copied the object pointer to a place where the object pointer is accessible from another AP thread, the object indicated by the object pointer must be marked.

2. Second Embodiment

The following describes a GC system of the second embodiment of the present invention with reference to the drawings.

The GC system of the second embodiment is essentially the same as the GC system 10 of the first embodiment in that AP threads are successively stopped and subject to reference processing. However, the difference between the two is that the GC system of the second embodiment does not have object reference information and a GC flag for each AP thread, but instead has one set of object reference information and one GC flag for the system as a whole. A further difference is that the GC system of the present embodiment reduces the content of the thread information to an extent required for general multithreaded control.

Figure 15:
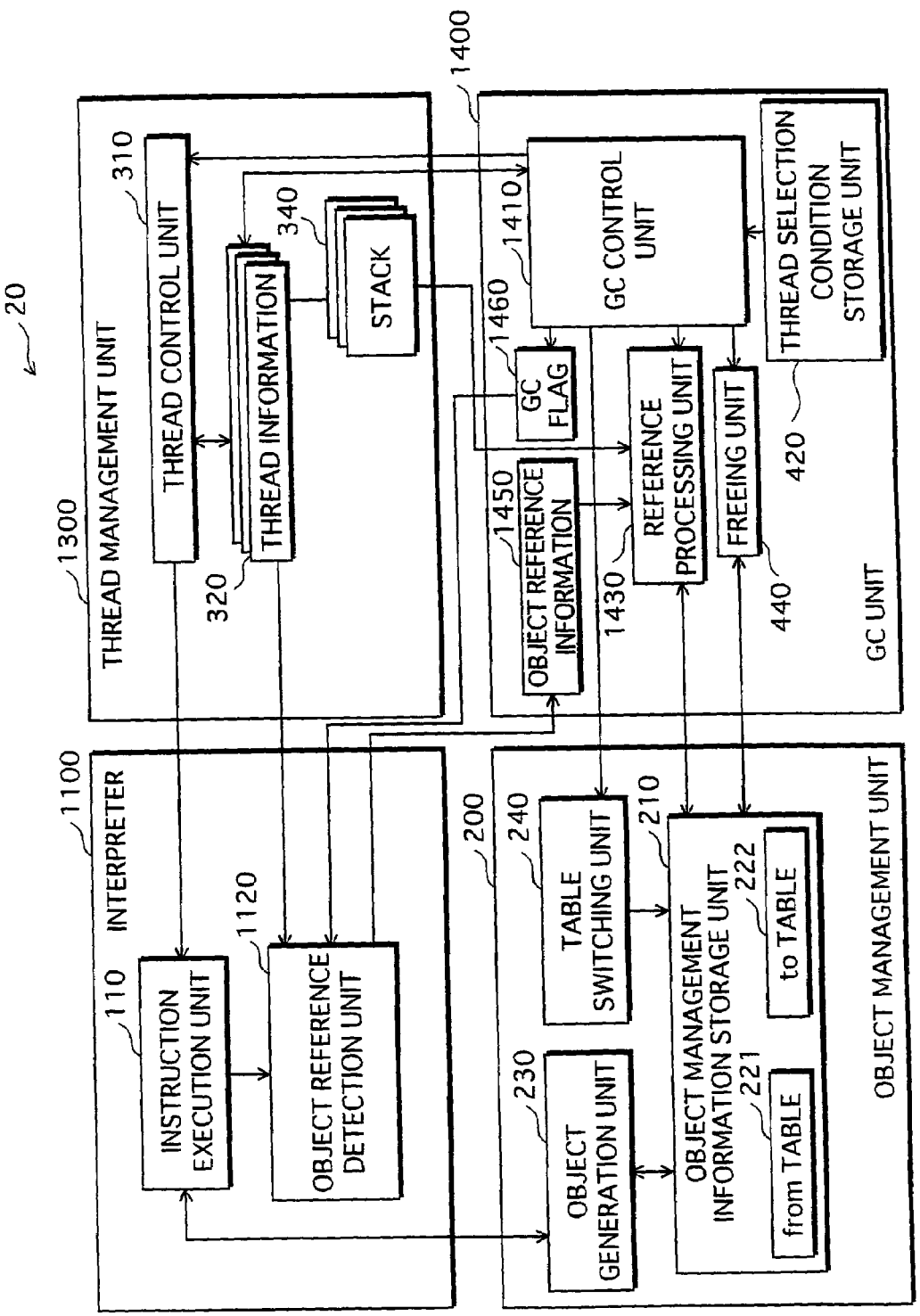
FIG. 15 is a functional block diagram of a GC system of a second embodiment of the present invention.

FIG. 15 is a functional block drawing of the GC system of the second embodiment of the present invention.

Structural components of the GC system 20 shown in FIG. 15 that are the same as structural components of the GC system 10 of the first embodiment have the same numbering thereas. The present description focuses on the compositional elements that are unique to the GC system 20. Note that any characteristics of the GC system not described here should be considered to be the same as the GC system 10.

The GC system 20, as shown in FIG. 15, is composed of an interpreter 1100, an object management unit 200, a thread management unit 1300, and a GC unit 1400.

Here, the interpreter 1100 is essentially an interpreter that has a function of executing APs, and includes the instruction execution unit 110 and an object reference detection unit 1120.

Figure 16:
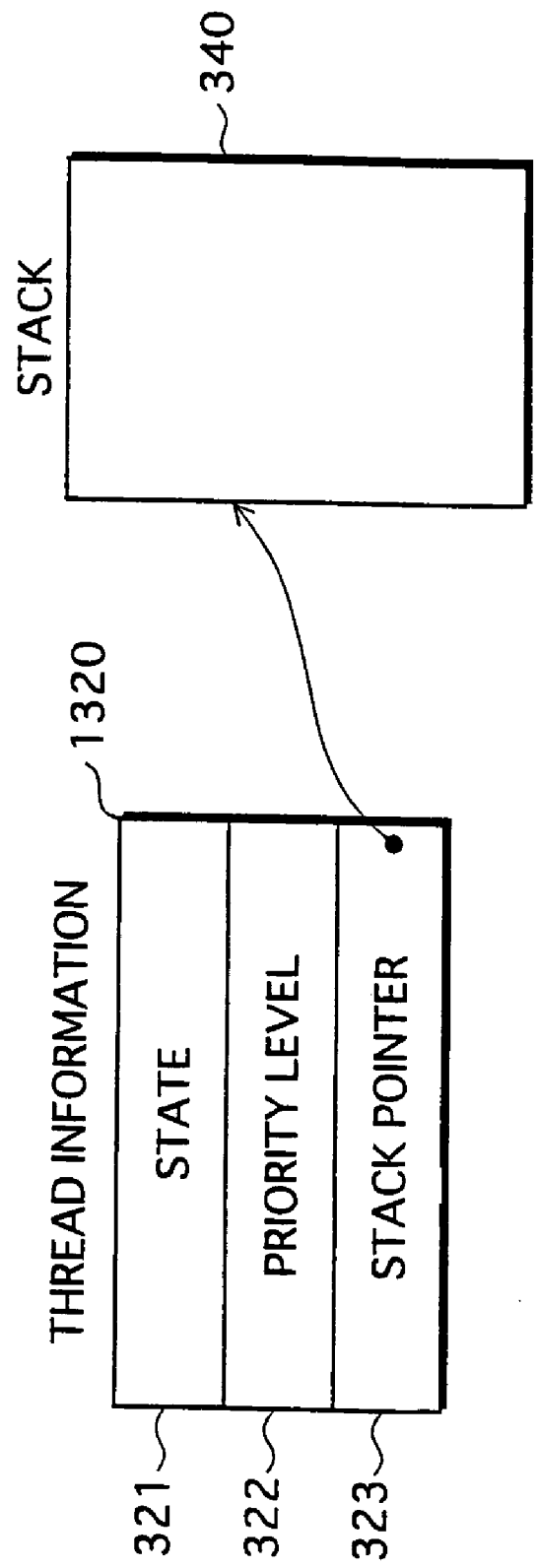
FIG. 16 shows thread information and a stack.

The thread management unit 1300 has a function of realizing multithreaded control and managing threads. The thread management unit 1300 includes the thread control unit 310 and memory areas that correspond, for each AP thread, to thread information 1320 and a stack 340. Note that the thread information 1320, as shown in FIG. 16, includes a state 321, a priority level 322, and a stack pointer 323.

The GC unit 1400 is essentially a garbage collector, and includes a GC control unit 1410, a thread selection condition storage unit 420, a reference processing unit 1430, a freeing unit 440, object reference information 1450, and a memory area that corresponds to object reference information 1450 and a GC flag 1460.

The object reference detection unit 120 of the interpreter 1100 has a function of, only when the GC flag 1460 is ON, and when an instruction of an AP thread executed by the instruction execution unit 110 is an instruction that processes an object pointer of an object as a processing target, storing the object pointer in the memory area of the object reference information 1450.

GC that is performed primarily by the GC unit 400 essentially uses the mark-and-sweep method to successively select AP threads as a reference processing target, stop the selected AP thread, and after performing reference processing, remove the stop from the thread.

The reference processing unit 1430 of the GC unit 1400 has the function of performing reference processing by referring to the stack and the object reference information 1450. The object reference information 1450 is information whose contents include object pointers, in the same way as the object reference information of the GC system 10, but does not exist separately for each AP thread. Stored in the memory area of the object reference information are all objectpointers that have been a processing target of an instruction by the object reference detection unit 1120 by AP threads. Note that the thread information 1320, the stack 340, the object reference information 1450, and the GC flag 1460 are stored in the same way as objects and native data in the memory that includes the object management information storage unit 210.

Figure 17:
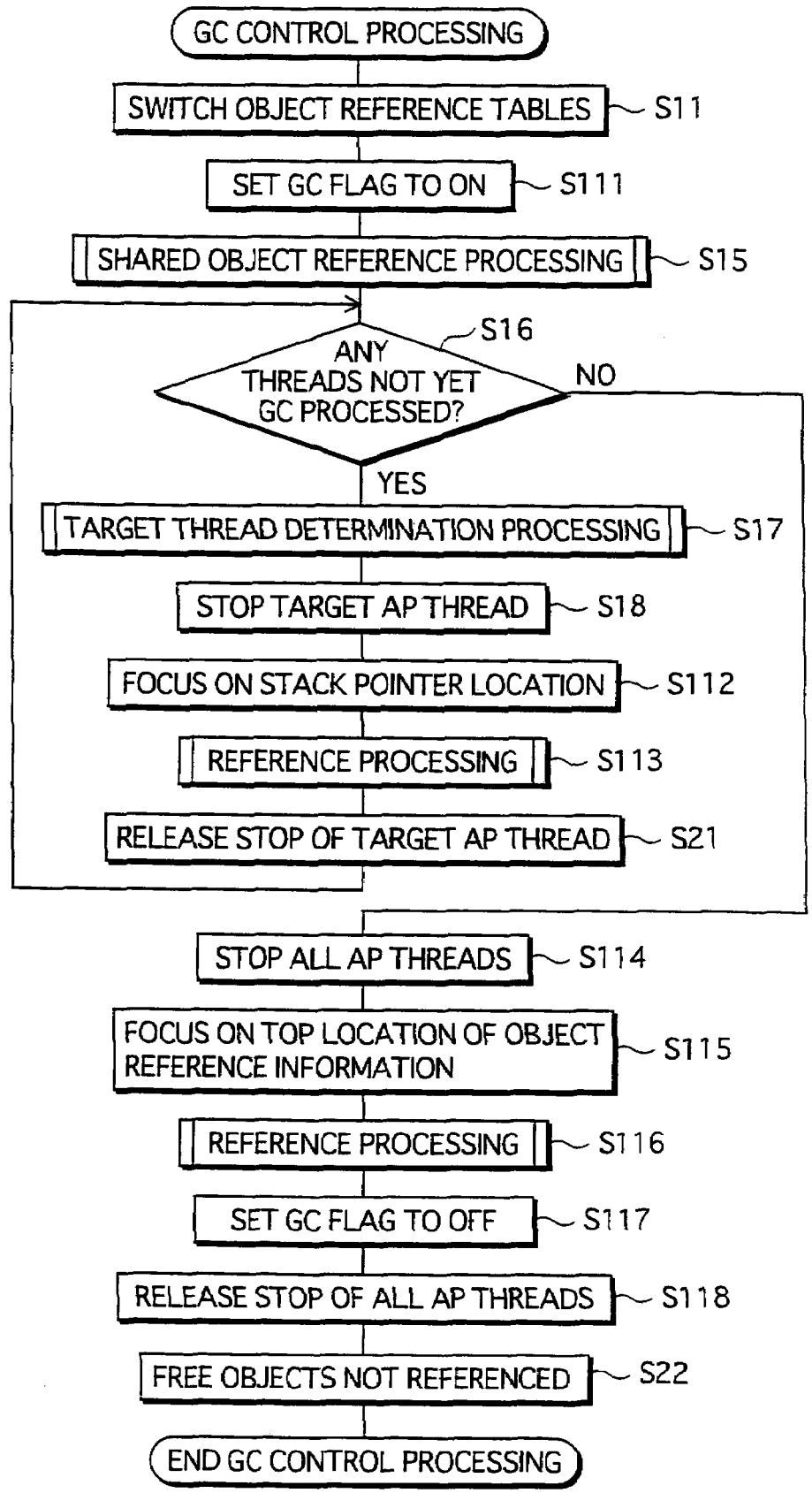
FIG. 17 is a flowchart showing GC control processing of the second embodiment.

Furthermore, the GC control unit 1410 has the function of execution GC control processing shown in FIG. 17.

FIG. 17 is a flowchart showing GC control processing of the second embodiment. Note that the steps in the flowchart that are the same as steps in the GC control processing of the first embodiment have the same numbering as in FIG. 8.

This GC control processing is performed in a fixed cycle based on a timer.

The GC control unit 1410 first switches the contents of the from table and the to table by exchanging the contents of the from table pointer 211 with the contents of the to table pointer 212 (step S11), and sets the GC flag 1460 to ON (step S111).

After step S111, the GC control unit 1410 performs shared reference processing for marking objects that can be reached by tracing object pointers in the shared object management information 353 (step S15). The GC control unit 410 determines whether or not any non-GC processed threads, in other words AP threads that have not been selected as a target of reference processing, exist (step S16).

When any non-GC processed threads are determined to exist at step at step S16, the GC control unit 410 performs target thread determination processing for selecting an AP thread as the target of reference processing (step S17), has the thread control unit 310 stop the selected AP thread (step S18), focuses on the location of the stack pointer corresponding to the selected AP thread (step S112), has the reference processing unit 1430 execute reference processing (see FIG. 12) (step S113), has the thread control unit 310 release the stop from the selected AP thread (step S21), and returns to the judgment at step S16.

Furthermore, when no non-GC processed threads are determined to exist at step S16, the GC control unit 410 has the thread control unit 310 stop all AP threads (step S114), focuses on the top location of the memory area of the object reference information (step S115), has the reference processing unit 1430 execute reference processing (step S116), sets the GC flag 1460 to OFF (step S117), has the thread control unit 310 remove the stop from all AP threads (step S118), has the freeing unit 440 free objects that are not marked (step S22), and ends the GC control processing.

Here, a simple description of the instruction execution processing performed by the interpreter 1100 is given.

Figure 18:
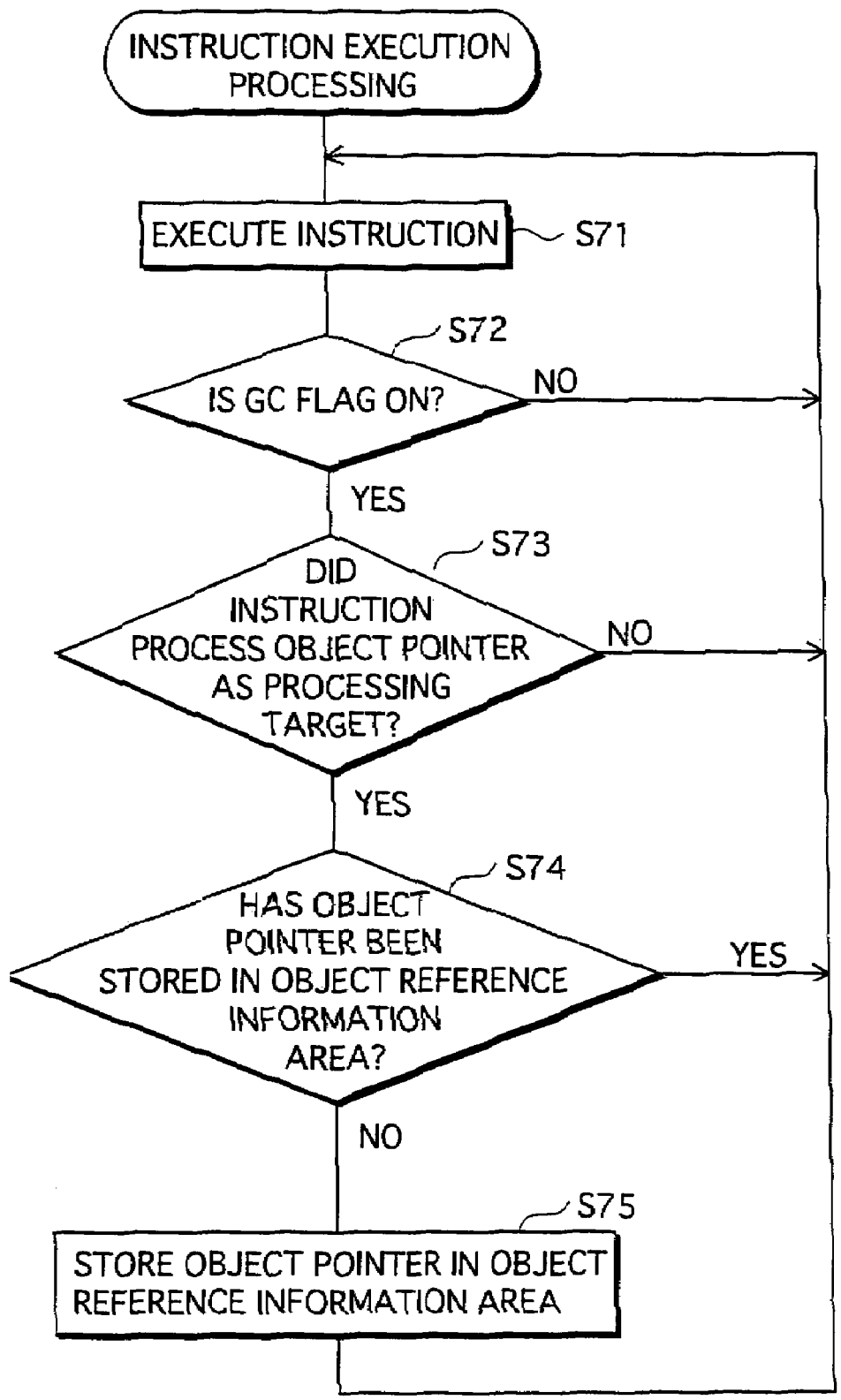
FIG. 18 is a flowchart showing instruction execution processing of the second embodiment.

FIG. 18 is a flowchart showing instruction execution processing in the second embodiment.

As can be seen in the drawing, this instruction execution processing is essentially equivalent to the instruction execution processing shown in FIG. 13 with step S76 removed.

First, the instruction execution unit 110 interprets and executes the instruction of the current execution location of the AP thread (step S71), and the object reference detection unit 1120 judges whether or not the GC flag 1460 is ON (step S72). If the GC flag 325 is not ON, the instruction execution unit 110 interprets and executes the next instruction (step S71).

If the GC flag is judged to be ON at step S72, the object reference detection unit 120 judges whether the instruction executed by the instruction execution unit 110 at step S71 was an instruction that processes an object pointer as a processing target (step S73), and if not, the instruction execution unit 110 interprets and executes the next instruction (step S71).

When it is judged at step S73 that the instruction was an instruction that processes an object pointer as a processing target, the object reference detection unit 120 judges whether data of the same value as the object pointer has been stored in the object reference information area (step S74), and if so, the instruction execution unit 110 interprets and executes the next instruction (step S71).

If it is judged at step S74 that data of the same value as the object pointer has not been stored in the object reference information memory area, the object reference detection unit 120 stores the object pointer in the object reference information (step S75), and the instruction execution unit 110 interprets and executes the next instruction (step S71).

In this way the GC control unit 1410 selects one AP thread as a target of reference processing by referring to the thread selection conditions, and after having the thread control unit 310 stop the selected thread, has the reference processing unit 1430 perform reference processing based on the stack corresponding to the AP thread. Next, after having the thread control unit 310 remove the stop from the selected AP thread, the GC control unit 1410 repeats the described procedure until no unprocessed AP threads exist. Then the GC control unit 1410 has the thread control unit 310 release the stop from all AP threads, has the reference processing unit 1430 perform reference processing based on the object reference information, has the thread control unit 310 remove the stop from all AP threads, and has the freeing unit 410 free all objects that are not marked.

3. Observations

The following gives a brief description of the differences between objects managed by the described GC system of the present invention, and objects in a conventional garbage collector in a Java execution environment or the like.

The GC system of the present invention shown in the first and second embodiments, when executing an AP created with an object-oriented language such as Java that relieves programmers from being concerned with freeing of allocated memory, performs allocation of memory at the time of generating an object and freeing the memory corresponding to that object through a conventional OS memory management mechanism that uses an MMU. This means that memory areas assigned for objects exist together in the logical address space with memory areas assigned for native data (i.e., data of programs created with other languages such as C language). FIG. 3 expresses this concept of co-existence.

Figure 19:
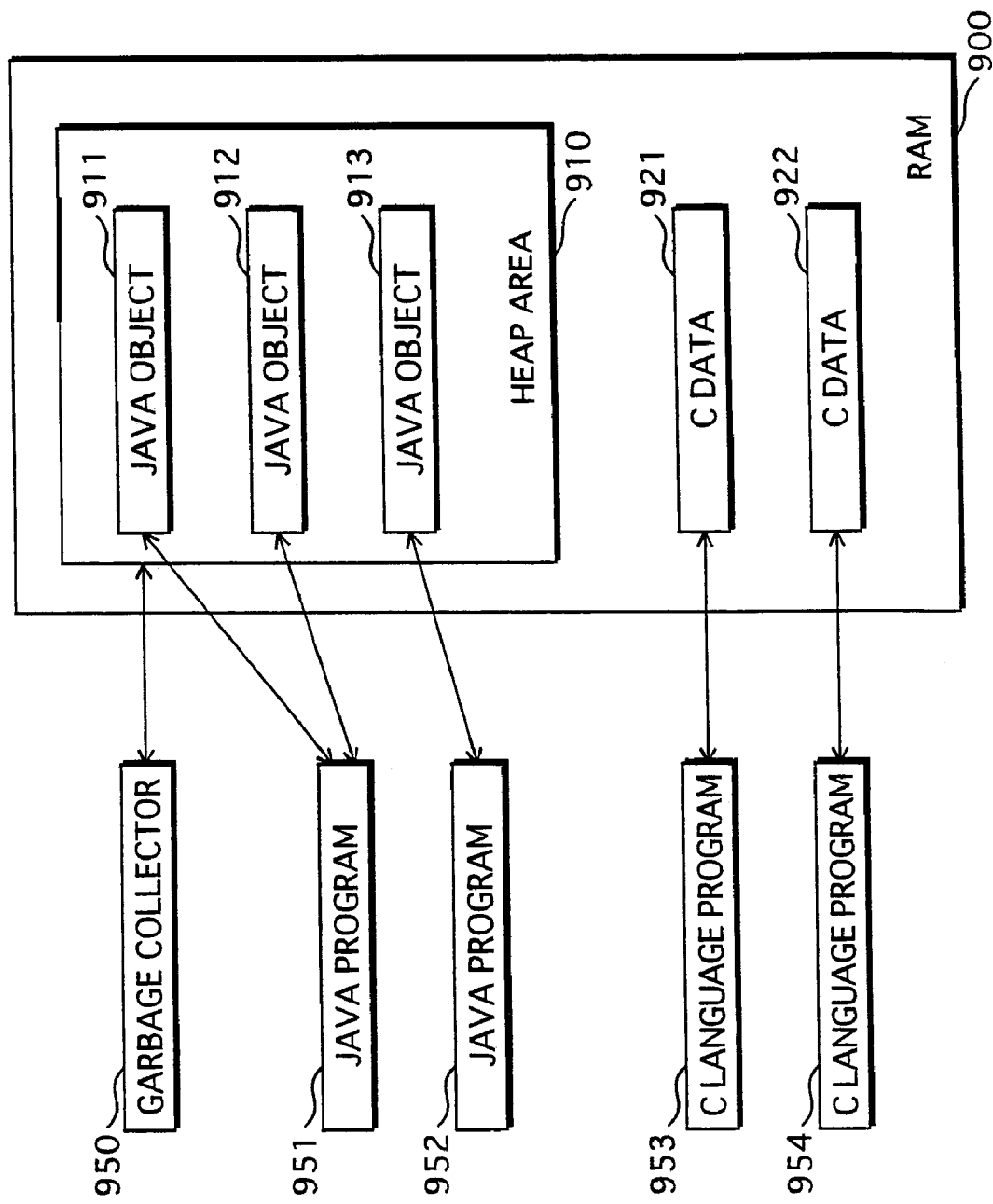
FIG. 19 shows Java objects managed by a conventional Java execution environment, and arrangement in a memory of the Java objects and data of a C language program.

In contrast, the state of Java objects managed by a conventional Java execution environment and data of, in this instance, a C language program (hereinafter called "C data") in a memory is shown in FIG. 19.

As shown in FIG. 19, C language programs 953 and 954 secure memory areas for C data 921 and 922 in a random access memory (RAM) 900 via an OS memory management mechanism.

Furthermore, Java objects 911 to 913 generated from the Java programs 951 and 952 are allocated to a heap area 910, and management of an array within the heap area 950 is performed not by the OS, but by the Java execution environment that includes a garbage collector 950. For this reason, the Java execution environment first secures a heap area through the OS memory management mechanism, and then when generating the object, allocates one area within the heap area to the object. This heap area reduces the amount of memory that can be used for programs of other languages.

Furthermore, when freeing an object, the Java execution environment manages an area allocated to the object in the heap area as an unused area that can be newly allocated to an object. However, it is necessary to perform memory compaction in order to connect all unused areas in the heap area as required.

Note that in this respect, the GC system of the present invention as shown in the first and second embodiments does not perform heap area allocation or management, but performs memory allocation for objects directly through the conventional OS memory management mechanism. Therefore, memory compaction in a heap area is, naturally, unnecessary.

4. Additional Remarks

Although the GC system of the present invention has been described based on the first and second embodiments, the present invention is not limited to these embodiments. The following describes some possible modifications.

(1) Although the thread selection conditions are described as including three conditions, specifically, thread state, priority level and stack size, which are given priority in the stated order, the number of conditions and the order in which they are applied are not limited to this example. For example, selection may be made giving priority to threads with a high priority level, or to threads with a large stack size.

However it should be noted that selecting an AP thread in a wait state for the reference processing target as described in the embodiments will adversely effect the AP currently operating. Furthermore, the time required to perform reference processing (see FIG. 12) with respect to AP threads according to a reference processing algorithm is shorter for AP threads for which reference processing is performed later than for AP threads for which reference processing is performed earlier. Therefore, by selecting low priority threads as reference processing targets earlier as shown in the embodiments, the time for which high-priority AP threads that require immediate response are stopped can be reduced. Furthermore, for the same reason, since the time required for reference processing is greater for larger stack sizes, by performing reference processing in order of corresponding stack size starting from the smallest corresponding stack size, the time for which AP threads are stopped can be distributed evenly to an extent between AP threads of the same priority level.

(2) GC control processing is not limited to being performed in a fixed cycle based on a timer as described in the embodiments. Instead, GC control processing may be performed when the amount of memory allocable to APs falls below a predetermined amount.

(3) The memory area of the object reference processing described in the embodiments may be a memory area expressed by a contiguous physical address. Alternatively, a memory area of a set amount may be additionally allocated when necessary at the time of storing an object pointer, and the allocated segmented memory areas may be treated as a continuous memory area in terms of logical address.

(4) In the GC system described in the first embodiment, when an object pointer is the processing target in the instruction execution processing by the interpreter, and if the GC flag is ON, by performing processing to store the object pointer in the memory area of the object reference information, and omitting, from the instruction execution processing, reference processing for moving data of the same value as the object pointer from the from table, the speed of the instruction execution by the interpreter is maintained. However, reference processing may be performed during the instruction execution processing.

(5) In the embodiments, pointers to objects that can be reached from object pointers in the shared object management information are moved from the from table to the to table according to reference processing. However, it is not necessary to perform reference processing. It is sufficient for objects that are managed according to the shared object management information to be excluded from being a target of freeing by the freeing unit.

(6) The GC system shown in the embodiments is not limited to being implemented in a computer, but may be implemented a device that includes a CPU, such as a mobile terminal or home telephone.

(7) The thread control unit shown in the embodiments executes the threads in series by switching between threads at minute intervals. In other words, the thread control unit performs pseudo-parallel execution of the threads. However, the threads may actually be executed in parallel by a plurality of processor elements in a multiprocessor.

(8) In the embodiments, objects generated by the object generation unit are assigned memory in the logical address space by the conventional OS memory management mechanism in the same way as native data. However, special management may be performed to assign memory to each object in a heap area that is one section in the logical address space. This special management may be realized by securing the heap area according to a conventional OS memory management mechanism, allocating an unallocated area in the heap area for generation of an object, and when an object is freed, setting the corresponding area as an unused area. In this special management, it is necessary to further perform memory compaction in order to connect the segmented unallocated areas in the heap area. Note that for this reason, as shown in <3. Observations> this method of using a heap area is not necessarily the optimal method.

(9) The GC system shown in the embodiments includes a conventional OS memory management mechanism. However, an alternative is to provide the conventional OS memory management mechanism that manages memory using an MMU external to the GC system as a platform environment for the GC system. Here, the GC system secures and frees memory through the external memory management mechanism.

(10) A program for having a CPU executing the various processing (see FIG. 8 to FIG. 14, FIG. 17, and FIG. 18) for realizing the functions of the GC system shown in the embodiments may be distributed recorded on a recording medium or via any of various types of communication paths. Examples of such a recording medium include an IC card, an optical disc, a flexible disk, and a ROM. The distributed program may be put to use by being stored in a memory or the like that is readable by a CPU in a device that includes a CPU. The functions of the GC system shown in the embodiments are realized by CPU executing the program.

The GC system of the present invention may be used as an execution environment on a computer for APs (application programs) created in an object-oriented programming language, such as Java, that relieves the creators of the APs from being concerned with allocation and freeing of memory area.

The invention claimed is:

1. A garbage collection system for freeing memory areas corresponding to objects that are no longer required in an execution procedure of an object-oriented program including a plurality of threads, the garbage collection system comprising:
 a selection unit operable to select the threads of the object-oriented program one at a time;
 an examination unit operable to examine each selected thread, the examination including (i) stopping execution of a selected thread, (ii) finding an object that is accessible from the selected thread by referring to an object pointer of the selected thread, (iii) managing the object found by the finding as a non-freeing target, and (iv) resuming execution of the selected thread;
 a detection unit operable to, after the selection unit has commenced selecting, (i) detect an object pointer that has been processed as a processing target by a currently-executed thread, and (ii) manage an object identified by the object pointer detected as the processing target, as a non-freeing target; and
 a freeing unit operable to, after the examination unit has completed examining all of the threads, free memory areas that correspond to objects other than the objects that are managed as non-freeing targets, wherein:
 the detection unit performs the detection only when the currently-executed thread has not yet been subject to examination by the examination unit; and
 the detection unit includes:

a finding sub-unit operable to, when the detection has been performed, store, to a working memory area that corresponds to the currently-executed thread, the object pointer detected as the processing target and an object pointer of an object that can be reached from the object pointer detected as the processing target; and
 a management sub-unit operable to, while the execution of a selected thread is being stopped by the examination unit, manage, as a non-freeing target, an object that can be reached from the object pointer stored in the working memory area corresponding to the currently-executed thread.

2. The garbage collection system of claim 1, wherein:
 when an object identified by an object pointer in a stack corresponding to the selected thread is found to be accessible, the examination of the examination unit repeatedly performs a procedure, only when both (a) the accessible object is not already being managed as a non-freeing target and (b) an object pointer exists in the accessible object, of further finding that an object identified by the object pointer in the accessible object is accessible;
 the selection unit, after a first selection, further performs selection if, after the examination of the first selection has been performed by the examination unit, any threads of the plurality of threads remain that have not been subject to the examination of the examination unit; and
 the selection unit refers to information about the threads, and makes the selection based on one or more predetermined thread selection conditions.

3. The garbage collection system of claim 2, wherein:
 the thread selection conditions include a condition indicating that any threads having a thread state that is a wait state are to be selected before any threads having a thread state that is a state other than the wait state; and
 if a thread having a thread state that is the wait state exists when making the selection, the selection unit selects the thread having the state that is the wait state.

4. The garbage collection system of claim 3, wherein the thread selection conditions include a condition indicating that any threads having a thread priority level that is low are to be selected before any threads having a thread priority level that is high.

5. The garbage collection system of claim 4, wherein the thread selection conditions include a condition indicating that any threads having a corresponding stack size that is small are to be selected before any threads having a corresponding stack size that is large.

6. The garbage collection system of claim 5, further including a memory management mechanism that manages memory with use of a memory management unit,
 wherein each time an object is to be generated, a memory area corresponding to the object is allocated by the memory management mechanism, and
 wherein the freeing unit frees the memory areas via the memory management mechanism.

7. The garbage collection system of claim 2, wherein the thread selection conditions include a condition indicating that any threads having a corresponding stack size that is small are to be selected before any threads having a corresponding stack size that is large.

8. The garbage collection system of claim 2, wherein the thread selection conditions include a condition indicating that any threads having a thread priority level that is low are to be selected before any threads having a thread priority level that is high.

9. The garbage collection system of claim 1, further including a memory management mechanism that manages memory with use of a memory management unit,
  wherein each time an object is to be generated, a memory area corresponding to the object is allocated by the memory management mechanism, and
  wherein the freeing unit frees the memory areas via the memory management mechanism.

10. A garbage collection method that, in a computer, frees memory areas corresponding to objects that are no longer required in an execution procedure of an object-oriented program including a plurality of threads, the garbage collection method comprising:
  selecting the threads of the object-oriented program one at a time;
  examining each selected thread, the examining including (i) stopping execution of a selected thread, (ii) finding an object that is accessible from the selected thread by referring to an object pointer of the selected thread, (iii) managing the object found by the finding as a non-freeing target, and (iv) resuming execution of the selected thread;
  after the selecting of the threads has commenced, (i) detecting an object pointer that has been processed as a processing target by a currently-executed thread, and (ii) managing an object identified by the object pointer detected as the processing target, as a non-freeing target; and
  after the examining has completed examining all of the threads, freeing memory areas that correspond to objects other than the objects that are managed as non-freeing targets, wherein:
    the detecting is only performed when the currently-executed thread has not yet been subject to the examining; and
    the detecting includes:
      when the detecting has been performed storing to a working memory area that corresponds to the currently-executed thread, the object pointer detected as the processing target and an object pointer of an object that can be reached from the object pointer detected as the processing target; and
      while the execution of a selected thread is being stopped by the examining, managing, as a non-freeing target, an object that can be reached from the object pointer stored in the working memory area corresponding to the currently-executed thread.

11. The garbage collection method of claim 10, wherein:
  the computer uses a memory management mechanism that manages memory with use of a memory management unit, and, in an execution procedure of an object-oriented program, each time an object is to be generated, allocates a memory area corresponding to the object according to the memory management mechanism; and
  the freeing frees the memory areas via the memory management mechanism.

12. A computer-readable storage medium having a computer program stored thereon, the computer program for having a computer execute garbage collection processing that frees memory areas corresponding to objects that are no longer required in an execution procedure of an object-oriented program including a plurality of threads, the computer program causing the computer to execute a method comprising:
  selecting the threads of the object oriented-program one at a time;
  examining each selected thread, the examining of including (i) stopping execution of a selected thread, (ii) finding an object that is accessible from the selected thread by referring to an object pointer of the selected thread, (iii) managing the object found by the finding as a non-freeing target, and (iv) resuming execution of the selected thread;
  after the selecting of the threads has commenced, (i) detecting an object pointer that has been processed as a processing target by a currently-executed thread, and (ii) managing an object identified by the object pointer detected as the processing target, as a non-freeing target; and
  after the examining has completed examining all of the threads, freeing memory areas that correspond to objects other than the objects that are managed as non-freeing targets, wherein:
    the detecting is only performed when the currently-executed thread has not yet been subject to the examining; and
    the detecting includes:
      when the detecting has been performed, storing, to a working memory area that corresponds to the currently-executed thread, the object pointer detected as the processing target and an object pointer in an object that can be reached from the object pointer detected as the processing target; and
      while the execution of a selected thread is being stopped by the examining, managing, as a non-freeing target, an object that can be reached from the object pointer stored in the working memory area corresponding to the currently-executed thread.

13. The garbage collection method of claim 12, wherein
  the computer uses a memory management mechanism that manages memory with use of a memory management unit, and, in an execution procedure of an object-oriented program, each time an object is to be generated, allocates a memory area corresponding to the object according to the memory management mechanism; and
  the freeing step frees the memory areas via the memory management mechanism.

14. The garbage collection system of claim 1, wherein the currently-executed thread is a thread that is being executed according to reference processing.

15. The garbage collection system of claim 14, wherein the execution that is stopped by the execution unit is execution by an interpreter.

* * * * *